United States Patent
Paz et al.

(10) Patent No.: US 12,218,868 B2
(45) Date of Patent: *Feb. 4, 2025

(54) AMPLITUDE-MODULATED PHASE TRACKING REFERENCE SIGNALS FOR A MULTILAYER COMMUNICATION LINK

(71) Applicant: QUALCOMM Incorporated, San Diego, CA (US)

(72) Inventors: Daniel Paz, Geva Carmel (IL); Assaf Touboul, Netanya (IL); Michael Levitsky, Rehovot (IL); Ory Eger, Tel Aviv (IL); Shay Landis, Hod Hasharon (IL); Idan Michael Horn, Hod Hasharon (IL); Gideon Shlomo Kutz, Ramat Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,745

(22) Filed: May 5, 2021

(65) Prior Publication Data

US 2021/0376978 A1    Dec. 2, 2021

Related U.S. Application Data

(60) Provisional application No. 63/033,602, filed on Jun. 2, 2020.

(51) Int. Cl.
*H04L 5/00* (2006.01)
*H04L 1/1607* (2023.01)
(Continued)

(52) U.S. Cl.
CPC .......... *H04L 5/0048* (2013.01); *H04L 1/1607* (2013.01); *H04L 25/03006* (2013.01); *H04L 27/02* (2013.01); *H04L 2025/03636* (2013.01)

(58) Field of Classification Search
USPC .......................................... 370/329
See application file for complete search history.

(56) References Cited

U.S. PATENT DOCUMENTS

| | | | |
|---|---|---|---|
| 6,466,566 B1 * | 10/2002 | De Gaudenzi | H04B 1/71055 375/144 |
| 11,258,566 B2 | 2/2022 | Nam et al. | |

(Continued)

FOREIGN PATENT DOCUMENTS

| | | |
|---|---|---|
| WO | 2019051085 A1 | 3/2019 |
| WO | 2019079406 | 4/2019 |

(Continued)

OTHER PUBLICATIONS

Ericsson: "Feature Lead Summary 3 of PT-RS," 3GPP Draft, 3GPP TSG RAN WG1 Meeting #92, R1-1803384, Feature Lead Summary 3 on PTRS_V3, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 26, 2018-Feb. 30, 2018, Mar. 1, 2018 (Mar. 1, 2018), pp. 1-12, XP051398617, Retrieved from the Internet: URL: http://www.3gpp.org/ftp/tsg%5Fran/WG1%5FRL1/TSGR1%5F92/Docs/ [retrieved on Mar. 1, 2018] Section 1.2.

(Continued)

*Primary Examiner* — Jeffrey M Rutkowski
*Assistant Examiner* — Luna Weissberger
(74) *Attorney, Agent, or Firm* — Harrity & Harrity, LLP

(57) ABSTRACT

Various aspects of the present disclosure generally relate to wireless communication. In some aspects, a user equipment may transmit an indication of a capability of the UE to communicate one or more of uplink transmissions or downlink transmissions having amplitude-modulated phase tracking reference signals on at least a first layer of a multilayered communication link that includes the first layer and a second layer; and communicate an uplink transmission or a down- (Continued)

link transmission based at least in part on the indication. Numerous other aspects are provided.

30 Claims, 10 Drawing Sheets

(51) Int. Cl.
  *H04L 25/03* (2006.01)
  *H04L 27/02* (2006.01)

(56) References Cited

U.S. PATENT DOCUMENTS

| | | | |
|---|---|---|---|
| 2018/0205528 A1* | 7/2018 | Bai | H04L 5/0092 |
| 2021/0058207 A1* | 2/2021 | Lee | H04L 5/0044 |
| 2022/0094496 A1* | 3/2022 | Xiong | H04W 72/0446 |

FOREIGN PATENT DOCUMENTS

| | | | |
|---|---|---|---|
| WO | 2019099535 A1 | | 5/2019 |
| WO | 2020034163 A1 | | 2/2020 |
| WO | WO-2020261402 A1 | * | 12/2020 |

OTHER PUBLICATIONS

International Search Report and Written Opinion - PCT/US2021/031048—ISA/EPO—Aug. 2, 2021.
Nokia, et al., "On Details on PT-RS Design for CP-OFDM," 3GPP Draft, 3GPP TSG RAN WG1 #90, R1-1714257, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 21, 2017-Aug. 25, 2017, Aug. 20, 2017 (Aug. 20, 2017), XP051317043, 5 pages, Retrieved from the Internet: URL: http://www.3gpp.org/ftp/Meetings_3GPP_SYNC/RAN1/Docs/ [retrieved on Aug. 20, 2017] Section 2.3 figures 2.3.

* cited by examiner

AMPLITUDE-MODULATED PHASE TRACKING REFERENCE SIGNALS FOR A MULTILAYER COMMUNICATION LINK

CROSS-REFERENCE TO RELATED APPLICATION

This patent application claims priority to Provisional Patent Application No. 63/033,602, filed on Jun. 2, 2020, entitled "AMPLITUDE-MODULATED PHASE TRACKING REFERENCE SIGNALS FOR A MULTILAYER COMMUNICATION LINK," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for amplitude-modulated phase tracking reference signals for a multilayer communication link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting an indication of a capability of the UE to communicate one or more of uplink transmissions or downlink transmissions having amplitude-modulated phase tracking reference signals (PT-RSs) on at least a first layer of a multilayered communication link that includes the first layer and a second layer; and communicating an uplink transmission or a downlink transmission based at least in part on the indication.

In some aspects, a method of wireless communication, performed by a base station, may include receiving an indication of a capability of a UE to communicate one or more of uplink transmissions or downlink transmissions having amplitude-modulated PT-RSs on at least a first layer of a multilayered communication link that includes the first layer and a second layer; and communicating an uplink transmission or a downlink transmission based at least in part on the indication.

In some aspects, a non-transitory computer-readable medium may store one or more instructions for wireless communication. The one or more instructions, when executed by one or more processors of a UE, may cause the one or more processors to transmit an indication of a capability of the UE to communicate one or more of uplink transmissions or downlink transmissions having amplitude-modulated PT-RSs on at least a first layer of a multilayered communication link that includes the first layer and a second layer; and communicate an uplink transmission or a downlink transmission based at least in part on the indication.

In some aspects, a non-transitory computer-readable medium may store one or more instructions for wireless communication. The one or more instructions, when executed by one or more processors of a base station, may cause the one or more processors to receive an indication of a capability of a UE to communicate one or more of uplink transmissions or downlink transmissions having amplitude-modulated PT-RSs on at least a first layer of a multilayered communication link that includes the first layer and a second layer; and communicate an uplink transmission or a downlink transmission based at least in part on the indication.

In some aspects, a user equipment for wireless communication may include a memory and one or more processors coupled to the memory. The memory and the one or more processors may be configured to transmit an indication of a capability of the UE to communicate one or more of uplink transmissions or downlink transmissions having amplitude-modulated PT-RSs on at least a first layer of a multilayered communication link that includes the first layer and a second layer; and communicate an uplink transmission or a downlink transmission based at least in part on the indication.

In some aspects, a base station for wireless communication may include a memory and one or more processors coupled to the memory. The memory and the one or more processors may be configured to receive an indication of a capability of a UE to communicate one or more of uplink transmissions or downlink transmissions having amplitude-modulated PT-RSs on at least a first layer of a multilayered communication link that includes the first layer and a second layer; and communicate an uplink transmission or a downlink transmission based at least in part on the indication.

In some aspects, an apparatus for wireless communication may include means for transmitting an indication of a capability of the apparatus to communicate one or more of uplink transmissions or downlink transmissions having amplitude-modulated PT-RSs on at least a first layer of a multilayered communication link that includes the first layer and a second layer; and means for communicating an uplink transmission or a downlink transmission based at least in part on the indication.

In some aspects, an apparatus for wireless communication may include means for receiving an indication of a capability of a UE to communicate one or more of uplink transmissions or downlink transmissions having amplitude-modulated PT-RSs on at least a first layer of a multilayered communication link that includes the first layer and a second layer; and means for communicating an uplink transmission or a downlink transmission based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
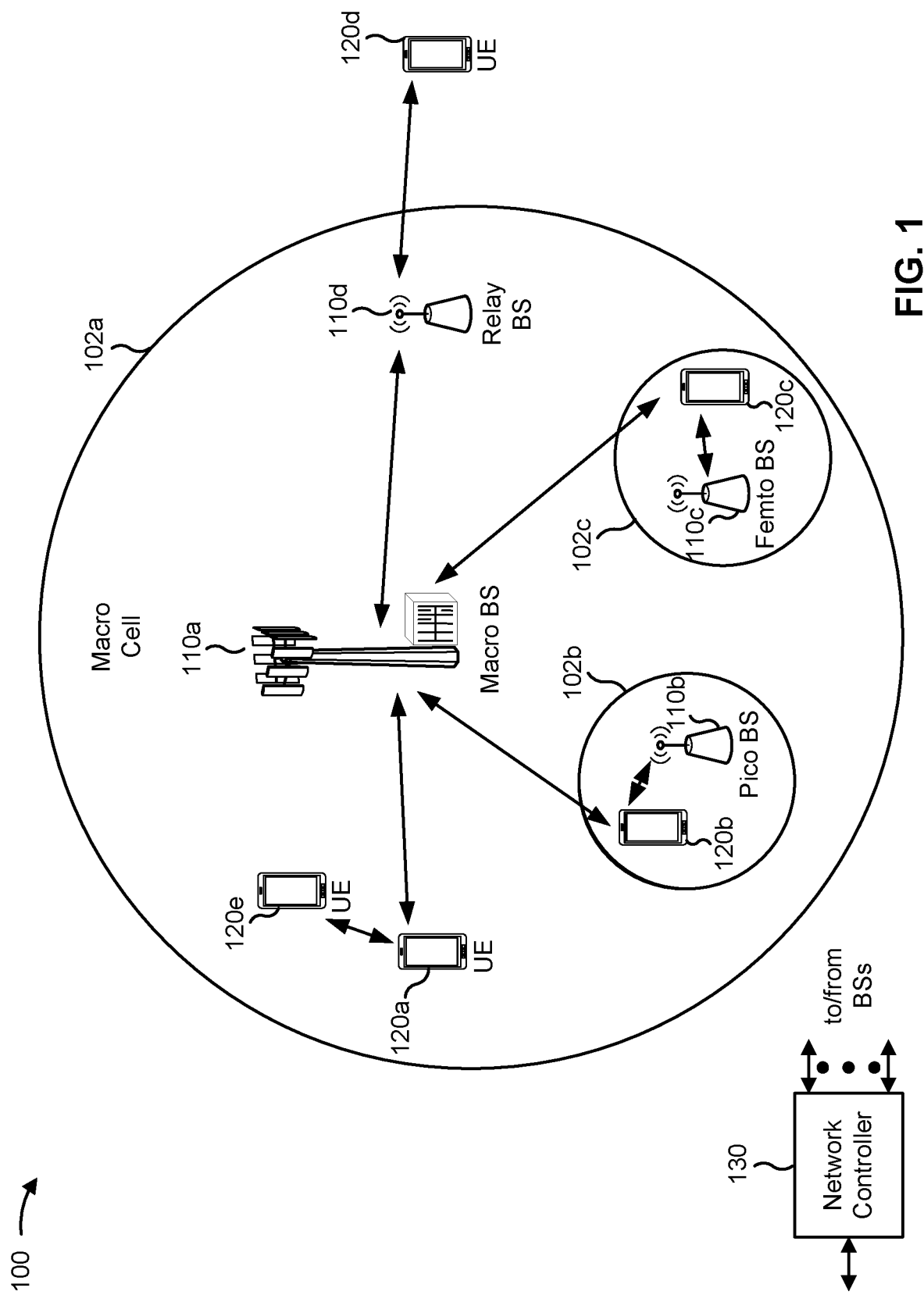
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
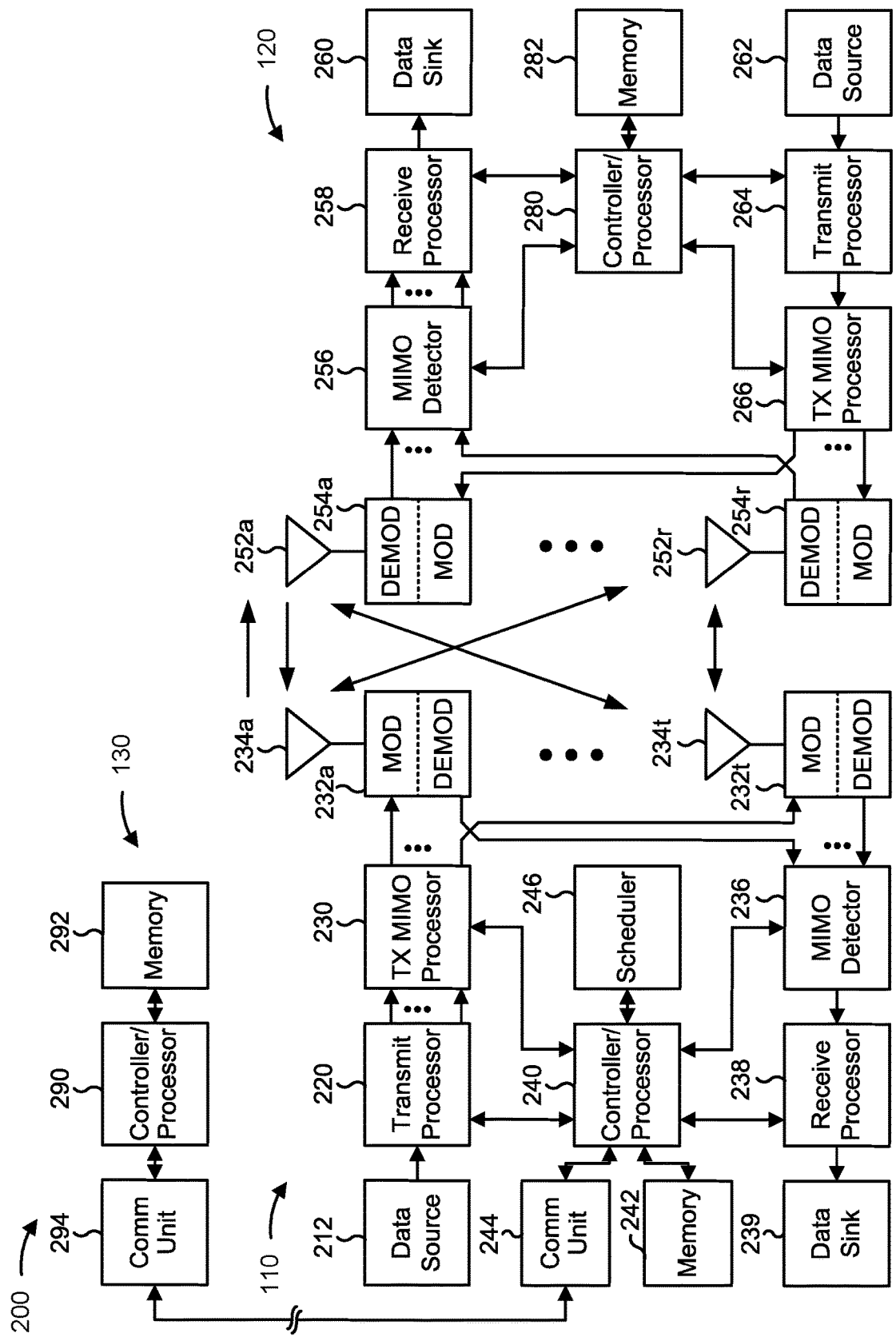
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-10).

Controller/processor 240 of base station 110, controller/processor 280 of UE 120, and/or any other component(s) of FIG. 2 may perform one or more techniques associated with amplitude-modulated phase tracking reference signals (PT-RSs) for a multilayer communication link, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for transmitting an indication of a capability of the UE to communicate one or more of uplink transmissions or downlink transmissions having amplitude-modulated PT-RSs on at least a first layer of a multilayered communication link that includes the first layer and a second layer; means for communicating an uplink transmission or a downlink transmission based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication of a capability of a UE to communicate one or more of uplink transmissions or downlink transmissions having amplitude-modulated PT-RSs on at least a first layer of a multilayered communication link that includes the first layer and a second layer; means for communicating an uplink transmission or a downlink transmission based at least in part on the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
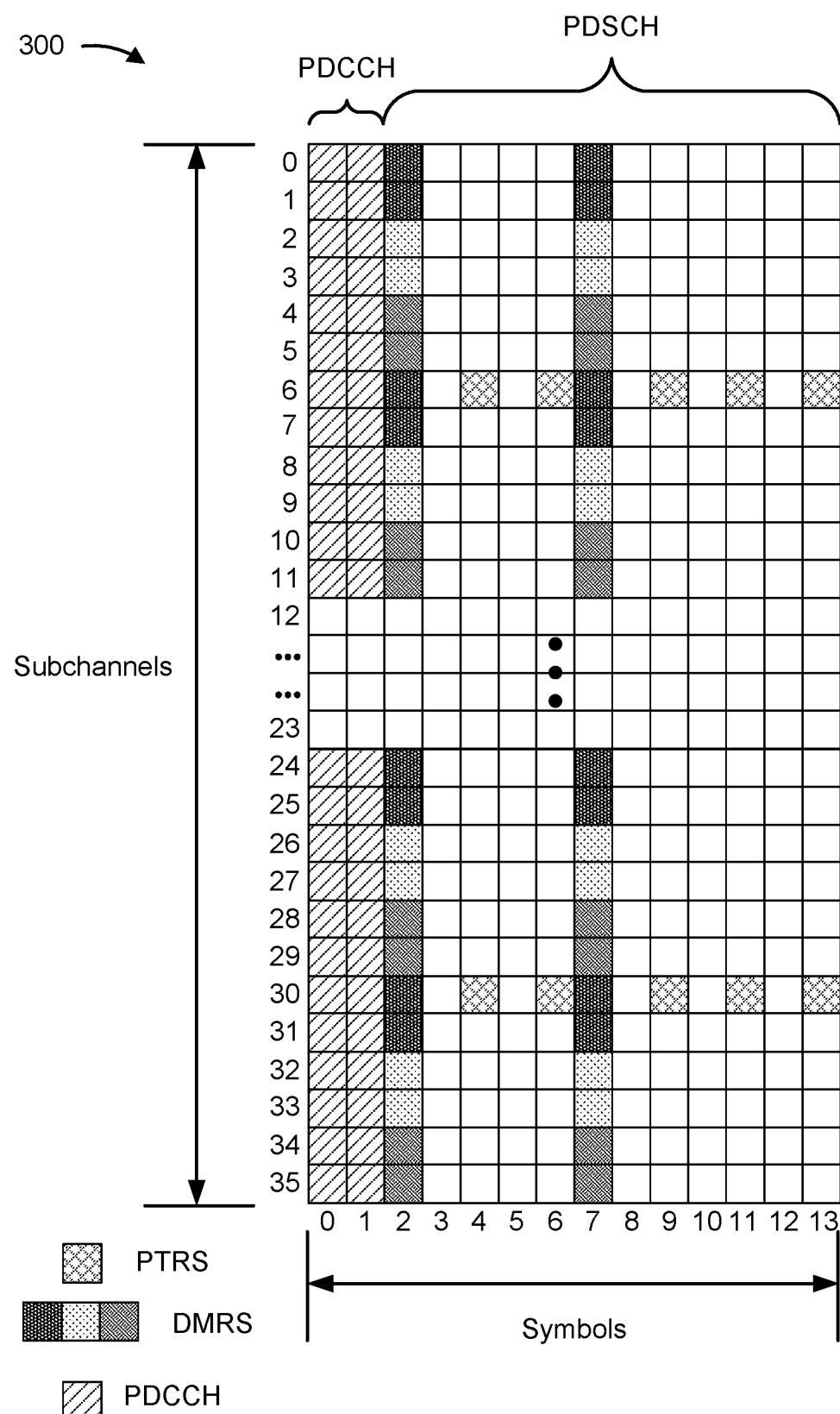
FIG. 3 is a diagram illustrating an example phase tracking reference signal structure in a physical downlink shared channel, in accordance with the present disclosure.

FIG. 3 is a diagram illustrating an example 300 phase tracking reference signal (PT-RS) structure in a physical downlink shared channel (PDSCH), in accordance with the present disclosure. As shown, the PDSCH may include a number of subchannels (e.g., 36 subchannels) and a number of symbols (e.g., 14 symbols).

A base station may transmit, and a UE may receive (e.g., or attempt to receive) PT-RSs, DMRSs, data, and/or the like using the PDSCH. Although described with reference to a PDSCH, the structure may be similarly applied to a physical uplink shared channel (PUSCH).

The PT-RSs may be a pilot for the PDSCH and may have a density in a frequency domain (e.g., relative to subcarriers) and a time domain (e.g., relative to symbols allocated for data). As shown in FIG. 3, the PT-RSs may have a density of ½ in the time domain and a density of 1/24 (e.g., 1 per resource block) in a frequency domain. The UE may receive the PT-RSs via a single port (e.g., port 1000) or multiple ports.

In some examples, the PT-RSs may be allocated using 1 resource (e.g., a resource element or a subchannel) per 2 resource blocks, 1 resource per 4 resource blocks, and/or the like. In some examples, the PT-RSs may be allocated using 1 resource element of a resource block per 1 symbol, 1 resource element of a resource block per 2 symbols, 1 resource element of a resource block per 4 symbols, and/or the like. A configuration of the PT-RSs may be configured (e.g., using radio resource control (RRC) signaling) and/or may be based at least in part on an associated MCS of the PDSCH. The PT-RSs may be defined by a Gold sequence.

As shown, the PDSCH may have a number (e.g., 2) of single-symbol DMRSs of a DMRS type (e.g., DMRS type 2). For example, the PDSCH may have 1 DMRS symbol per resource block. A receiving device may use the DMRS to roughly estimate and/or correct a frequency error within the symbol that includes the DMRS.

A PDSCH or a PUSCH may include PT-RSs for a receiving device (e.g., a UE, a base station, and/or the like) to account for residual frequency offset (e.g., a frequency offset that is developed within a resource block or slot), phase noise (e.g., introduced by an oscillator at a transmitting device, the receiving device, and/or the like), a CPE (e.g., a common phase rotation of subcarriers of the PDSCH, the PUSCH, and/or the like), and/or the like. For example, a receiving device may use the PT-RSs to estimate and/or correct phase noise (e.g., based at least in part on a detected residual frequency offset, a common phase error (CPE), and/or the like).

However, using PT-RSs in dedicated symbols and/or resources that may otherwise be allocated to data (e.g., application data) in the PDSCH may reduce a potential throughput of the PDSCH. In some examples, dedicated symbols and/or resources allocated for the PT-RSs may include 1/24 (about 4.16%) of symbols and/or resources of the PDSCH. By allocating resources for PT-RSs, a UE and/or a base station may consume computing, communication, and/or network resources to schedule additional resources to compensate for a reduction of throughput by consuming resources for the PT-RSs.

As indicated above, FIG. 3 is provided as an example. Other examples may differ from what is described with respect to FIG. 3.

In some aspects described herein, a UE and a base station may communicate with amplitude-modulated PT-RSs on at least a first layer of a multilayered communication link. In other words, a PDSCH or a PUSCH may be transmitted having data multiplexed, via amplitude modulation, with a PT-RS sequence in resources allocated for PT-RSs on the first layer. In some aspects, the UE may transmit an indication of a capability to communicate with amplitude-modulated PT-RSs (e.g., with resources that would otherwise have been dedicated to PT-RSs without additional data) on at least the first layer of the multilayered communication link. In some aspects, the base station may transmit an indication (e.g., in downlink control information (DCI), a configured grant, and/or the like) that one or more uplink transmissions or downlink transmissions are to be communicated (e.g., transmitted or received) with amplitude-modulated PT-RSs on at least the first layer of the multilayered communication link. In some aspects, the UE may transmit a request to communicate one or more uplink transmissions or downlink transmissions having amplitude-modulated PT-RSs on at least the first layer of the multilayered communication link. In some aspects, the base station may transmit a request to communicate one or more uplink transmissions or downlink transmissions with amplitude-modulated PT-RSs on at least the first layer of the multilayered communication link.

Based at least in part on the UE indicating a capability to communicate with amplitude-modulated PT-RSs on at least the first layer of the multilayered communication link and/or the UE requesting to communicate with amplitude-modulated PT-RSs on at least the first layer of the multilayered communication link, the base station and/or the UE may conserve computing, communication, and/or network resources that may otherwise have been used to schedule additional resources to compensate for using dedicated resources for PT-RSs. In some aspects, a throughput of a PDSCH or a PUSCH may improve by about 3%.

Figure 4:
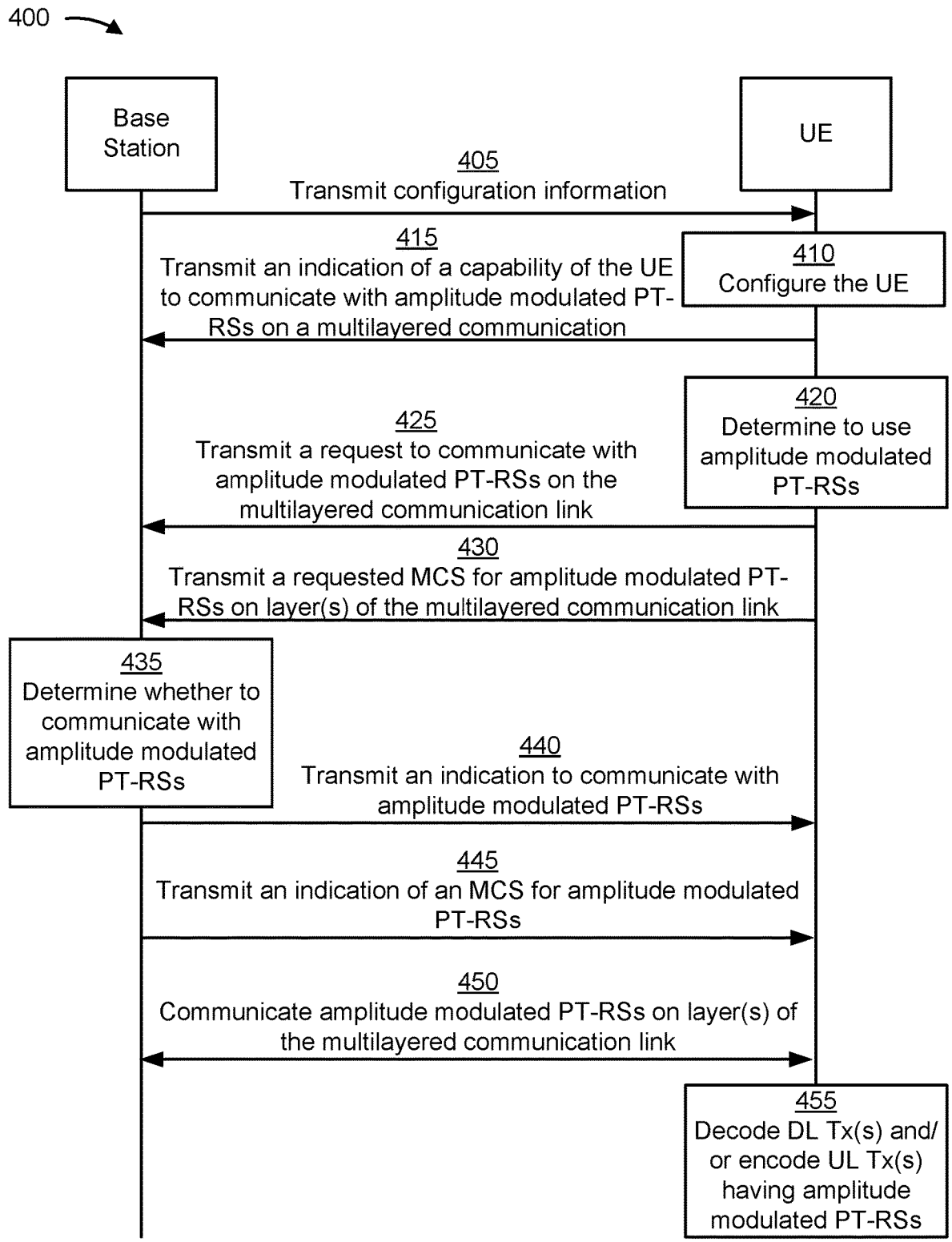
FIG. 4 is a diagram illustrating an example of amplitude-modulated phase tracking reference signals for a multilayer communication link, in accordance with the present disclosure.

FIG. 4 is a diagram illustrating an example 400 of amplitude-modulated PT-RSs for a multilayer communication link, in accordance with the present disclosure. As shown in FIG. 4, a UE (e.g., UE 120) may communicate with a base station (e.g., base station 110) using a multilayered communication link. The UE and the base station may be part of a wireless network (e.g., wireless network 100).

As shown by reference number 405, the base station may transmit, and the UE may receive, configuration information. In some aspects, the UE may receive configuration information from another device (e.g., from another base station, another UE, and/or the like). In some aspects, the UE may receive the configuration information via one or more of RRC signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to provide an indication of a capability of the UE to communicate with amplitude-modulated PT-RSs (e.g., for a PUSCH, a PDSCH, and/or the like) on at least one layer of the multilayer communication link. In some aspects, the configuration information may indicate that the base station may communicate with amplitude-modulated PT-RSs on at least one layer of the multilayer communication link. For example, the base station may be configured to communicate with amplitude-modulated PT-RSs on at least one layer of the multilayer communication link based at least in part on receiving a request from the UE, based at least in part on a determination by the base station that dedicated PT-RSs are unnecessary, that data may be transmitted on a second layer of the multilayered communication link using resources that carry the PT-RSs on the first layer, and/or the like.

In some aspects, the configuration information may indicate that the base station is to provide an indication of whether amplitude-modulated PT-RSs on at least one layer of the multilayer communication link are enabled. In some aspects, the configuration information may indicate that the UE is to be configured to communicate with amplitude-modulated PT-RSs on at least one layer of the multilayer communication link for a single transmission (e.g., uplink or downlink), a specified number of transmissions, a set of transmissions scheduled by a configured grant, transmissions within a specified time period, and/or the like.

In some aspects, the configuration information may indicate an MCS for symbols and/or resources used for amplitude-modulated PT-RSs. In some aspects, the configuration information may indicate a difference in MCS between symbols and/or resources that are used for amplitude-modulated PT-RSs on a layer and symbols and/or resources used to transmit other data on the layer (e.g., in resources that are not configured for pilots). In some aspects, the configuration information may indicate a maximum MCS for symbols and/or resources used for amplitude-modulated PT-RSs.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may transmit, and the base station may receive, an indication of a capability of the UE to communicate (e.g., one or more of uplink transmissions or downlink transmissions) using amplitude-modulated PT-RSs on at least one layer of the multilayer communication link. For example, the UE may indicate a capability of the UE to communicate using amplitude-modulated PT-RSs based at least in part on the UE being configured to determine and correct at least a portion of CPE using amplitude-modulated PT-RSs on at least one layer of the multilayer communication link. In some aspects, the UE may transmit the indication via RRC signaling, one or more MAC CEs, a physical uplink control channel (PUCCH) message, and/or the like.

In some aspects, the UE may indicate one or more ways in which the UE may communicate with amplitude-modulated PT-RSs on at least one layer of the multilayer communication link. For example, the UE may indicate whether the UE is capable of communicating with amplitude-modulated PT-RSs (e.g., having a known phase associated with a PT-RS sequence and an modulated amplitude to carry data) on a set of resources on the first layer of the multilayer communication link and with data (e.g., modulated with in-phase and a quadrature (IQ) modulation) on the same set of resources on the second layer of the multilayer communication link. Additionally, or alternatively, the UE may indicate whether the UE is capable of communicating with amplitude-modulated PT-RSs on the set of resources on first layer and the second layer.

In some aspects, the UE may indicate whether the UE is capable of communicating with PT-RSs (e.g., without amplitude modulation) on the set of resources of the first layer and data on the set of resources on the second layer. Although described in a context of communicating with amplitude-modulated PT-RSs on at least one layer of the multilayered communication link, the techniques and methods described herein may be applied to communicating with PT-RSs on a set of resources of the first layer of the multilayered communication link and communicating data on the same set of resources of the second layer.

As shown by reference number 420, the UE may determine to use amplitude-modulated PT-RSs on at least one layer of the multilayer communication link to transmit uplink transmissions and/or receive downlink transmissions. In some aspects, the UE may determine to communicate using amplitude-modulated PT-RSs on at least one layer of the multilayer communication link based at least in part on one or more metrics, such as an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, a signal to interference plus noise ratio (SINR) that satisfies a threshold, and/or the like. In some aspects, the UE may determine to communicate using amplitude-modulated PT-RSs on at least one layer of the multilayer communication link based at least in part on historical metrics, current metrics, predicted metrics, and/or the like.

As shown by reference number 425, the UE may transmit, and the base station may receive, a request to communicate using amplitude-modulated PT-RSs on at least one layer of the multilayer communication link. In some aspects, the UE may transmit the request via a PUSCH transmission. In some aspects, the request may include a single bit indicator of whether or not amplitude-modulated PT-RSs are requested for one transmission (uplink or downlink), a set of transmissions, and/or the like. In some aspects, the request may explicitly or implicitly indicate the capability of the UE to communicate with amplitude-modulated PT-RSs on at least one layer of the multilayer communication link. For example, by transmitting the request, the UE may implicitly indicate that the UE is capable to communicate with amplitude-modulated PT-RSs on at least one layer of the multilayer communication link.

In some aspects, the UE may transmit a request, for one or more uplink transmissions or one or more downlink transmissions, to use amplitude-modulated PT-RSs on at least one layer of the multilayer communication link. The request may indicate whether the UE requests amplitude-modulated PT-RSs on a single layer or multiple layers (e.g., a first layer and a second layer) of the multilayer communication link, may identify the requested single layer or multiple layers, and/or the like.

In some aspects, the request may apply to a single subsequent downlink transmission or uplink transmission, a set of downlink transmissions or a set of uplink transmissions scheduled by a configured grant, a specified number of downlink transmissions or uplink transmissions, downlink transmissions or uplink transmissions within a specified time period, and/or the like.

As shown by reference number 430, the UE may transmit, and the base station may receive, a requested MCS for symbols and/or resources associated with the amplitude-modulated PT-RSs. For example, the UE may transmit a request for an MCS for symbols and/or resources associated with the amplitude-modulated PT-RSs. In some aspects, the request may explicitly indicate a requested MCS, may indicate a requested difference between an MCS for symbols and/or resources associated with amplitude-modulated PT-RSs and an MCS for symbols and/or resources associated with other data, and/or the like.

In some aspects, the request may identify a first MCS for the first layer for symbols and/or resources associated with the amplitude-modulated PT-RSs, a second MCS for the second layer for the symbols and/or resources associated with the amplitude-modulated PT-RSs (e.g., the symbols and/or resources may carry data, amplitude-modulated PT-RSs, and/or the like on the second layer). In some aspects, the UE may transmit the request for the MCS with the request for amplitude-modulated PT-RSs on at least one layer of the multilayer communication link, with the indication of the capability of the UE to communicate with amplitude-modulated PT-RSs on at least one layer of the multilayer communication link, with a request to communicate with amplitude-modulated PT-RSs on at least one layer of the multilayer communication link, and/or the like.

As shown by reference number 435, the base station may determine whether to communicate with amplitude-modulated PT-RSs on at least one layer of the multilayer communication link. For example, the base station may determine whether to comply with a request from the UE to communicate using amplitude-modulated PT-RSs on at least one layer of the multilayer communication link, the base station may determine, independently from a request from the UE, to communicate using amplitude-modulated PT-RSs on at least one layer of the multilayer communication link, and/or the like. Additionally, or alternatively, the base station may determine which layer or layers are to have amplitude-modulated PT-RSs, whether data is to be carried on resources, for a layer without amplitude-modulated PT-RSs, that carry amplitude-modulated PT-RSs on at least one layer of the multilayered communication link, and/or the like.

In some aspects, the base station may determine to comply, or to not comply, with a request from the UE based at least in part on one or more metrics, such as an amount of buffered data for a downlink transmission, a size of a resource grant of an associated transmission (e.g., to which the request applies), an RSRP associated with the UE, movement of the UE, MCS for upcoming communications, a predicted change of conditions for SINR, and/or the like.

In some aspects, the base station may determine, independently from a request from the UE, to communicate (e.g., uplink transmissions or downlink transmissions) with amplitude-modulated PT-RSs on at least one layer of the multilayer communication link based at least in part on one or more metrics, such as a network load associated with the base station, an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, an SINR that satisfies a threshold, a capability of the UE to communicate with amplitude-modulated PT-RSs on at least one layer of the multilayer communication link, and/or the like. In some aspects, the base station may determine whether to communicate using amplitude-modulated PT-RSs on at least one layer of the multilayer communication link based at least in part on historical metrics, current metrics, predicted metrics, and/or the like.

As shown by reference number 440, the base station may transmit, and the UE may receive, an indication to communicate using amplitude-modulated PT-RSs. For example, the indication may indicate that the base station has approved a request from the UE, that the base station has determined to communicate using amplitude-modulated PT-RSs (e.g., independently from, or without, a request from the UE), and/or the like. In some aspects, the base station may transmit the indication, based at least in part on receiving the indication of the capability of the UE, that resources that would otherwise have been allocated for dedicated PT-RSs are to be allocated for amplitude-modulated PT-RSs on at least one layer of the multilayer communication link. In some aspects, the base station may provide the indication via a DCI message (e.g., using one or more bits), a MAC CE, RRC signaling, and/or the like.

The indication may include an indication of whether amplitude-modulated PT-RSs are to be used on a single layer or multiple layers (e.g., a first layer and a second layer) of the multilayer communication link and may identify the requested single layer or multiple layers.

In some aspects, the indication may apply to a single subsequent downlink transmission or uplink transmission, a set of downlink transmissions or a set of uplink transmissions scheduled by a configured grant, a specified number of downlink transmissions or uplink transmissions, downlink transmissions or uplink transmissions within a specified time period, and/or the like.

As shown by reference number 445, the base station may transmit, and the UE may receive, an indication of an MCS for amplitude-modulated PT-RSs. In other words, the base station may transmit an indication of an MCS for symbols and/or resources associated with the amplitude-modulated PT-RSs.

In some aspects, the MCS may be based at least in part on feedback signaling associated with a previous communication (e.g., via an outer ring adaptation loop). For example, the UE may transmit acknowledgement or negative acknowledgement (ACK/NACK) signaling for a downlink transmission from the base station for a previous transmission having amplitude-modulated PT-RSs on at least one layer of the multilayered communication link. Based at least in part on a receiving an ACK, the base station may indicate an increase in the MCS, no change to the MCS, no indication for the MCS (e.g., implying no change to the MCS), and/or the like. Based at least in part on receiving a NACK, the base station may indicate a decrease in MCS, no change to the MCS, and/or the like. In some aspects, the base station may indicate a change to the MCS with an explicit indication, a relative indication (e.g., an MCS relative to an MCS of a previous transmission), and/or the like.

Similarly, the base station may transmit ACK/NACK signaling for an uplink transmission from the UE for a previous transmission having amplitude-modulated PT-RSs on at least one layer of the multilayered communication link. Based at least in part on the base station transmitting an ACK, the UE may request, or the base station may indicate, an increase in the MCS, no change to the MCS, no indication for the MCS (e.g., implying no change to the MCS), and/or the like. Based at least in part on the base station transmitting a NACK, the UE may request, or the base station may indicate, a decrease in MCS, no change to the MCS, and/or the like. In some aspects, the UE may request, or the base station may indicate, a change to the MCS with an explicit indication, a relative indication (e.g., an MCS relative to an MCS of a previous transmission), and/or the like.

In some aspects, the base station may provide the indication of the MCS via a DCI message (e.g., using one or more bits), a MAC CE, and/or the like. In some aspects, the base station may transmit the indication of the MCS in a single message (e.g., a DCI message, MAC layer signaling, and/or the like) with the indication to communicate using amplitude-modulated PT-RSs on at least one layer of the multilayered communication link. For example, a DCI message may include 2 or more bits to indicate that amplitude-modulated PT-RSs are enabled and/or to indicate the MCS. The indication of the MCS may explicitly indicate the MCS, may indicate a difference between an MCS for symbols and/or resources associated with amplitude-modulated PT-RSs on at least one layer of the multilayered communication link and an MCS for symbols and/or resources associated with other data, and/or the like.

As shown by reference number 450, the UE and the base station may communicate using amplitude-modulated PT-RSs on at least one layer of the multilayer communication link. For example, the UE and the base station may communicate uplink transmissions and/or downlink transmissions using amplitude-modulated PT-RSs on at least one layer of the multilayer communication link. In some aspects, the amplitude-modulated PT-RSs may include a PT-RS sequence that is multiplexed, via amplitude modulation, with data. For example, the amplitude-modulated PT-RSs may include a PT-RS sequence indicated by phases of the amplitude-modulated PT-RSs and data that is indicated by amplitudes of the amplitude-modulated PT-RSs.

In some aspects, the UE may communicate (e.g., transmit and/or receive) the uplink transmission or the downlink transmission based at least in part on an assumption, based at least in part on transmitting the request for amplitude-modulated PT-RSs on at least one layer of the multilayer communication link, that the uplink transmission or the downlink transmission is to be transmitted having amplitude-modulated PT-RSs on at least one layer of the multilayer communication link. In other words, the UE may assume, without receiving additional signaling to confirm, that the base station will comply with the request to communicate using amplitude-modulated PT-RSs on at least one layer of the multilayer communication link.

In some aspects, the UE and the base station may communicate with a first codeword for data carried via a set of resources allocated for amplitude-modulated PT-RSs on the first layer and a second codeword (e.g., that is different from the first codeword) for data carried via the set of resources on the second layer. In some aspects, the second codeword may be a same codeword used for data carried via an additional set of resources allocated for data on the second layer.

In some aspects, data that is transmitted on symbols and/or resources associated with amplitude-modulated PT-RSs may have a cyclical redundancy check (CRC) that is different from one or more CRCs associated with other data of the uplink transmission or the downlink transmission (e.g., other data on a same layer and/or other data on a different layer). In some aspects, a receiving device (e.g., the UE for a downlink transmission or the base station for an uplink transmission) may decode the data associated with amplitude-modulated PT-RSs using convolution codes.

In some aspects, data transmitted on resources associated with the amplitude-modulated PT-RSs may be associated with a dedicated ACK/NACK bit that is different from one or more ACK/NACK bits that are associated with other data communicated via the uplink transmission or the downlink transmission. In some aspects, based at least in part on reporting a NACK for the amplitude-modulated PT-RSs, the base station may transmit, and the UE may receive (e.g., attempt to decode) a repetition of the amplitude-modulated PT-RSs via a subsequent PT-RS resource.

In some aspects, the UE and the base station may communicate with amplitude-modulated PT-RSs on a set of resources on the first layer and with amplitude-modulated PT-RSs on the set of resources on the second layer. In some aspects, the UE and the base station may communicate with amplitude-modulated PT-RSs on a set of resources on the first layer and with data on the set of resources on the second layer. In some aspects, the UE and the base station may communicate with PT-RSs (e.g., without amplitude modulation) on a set of resources on the first layer and with data on the set of resources on the second layer.

As shown by reference number 455, the UE may decode (e.g., demodulate, decode, receive, and/or the like) downlink transmissions and/or encode (e.g., modulate, encode, and/or the like) uplink transmissions having amplitude-modulated PT-RSs. Although aspects are described with reference to the UE, the base station may similarly decode uplink transmissions and/or encode downlink transmissions having amplitude-modulated PT-RSs.

In some aspects, the UE may determine that the downlink transmission has amplitude-modulated PT-RSs based at least in part on the indication to communicate with amplitude-modulated PT-RSs, the request to communicate with amplitude-modulated PT-RSs, the indication of the capability to communicate with amplitude-modulated PT-RSs, determining that the PT-RSs are amplitude-modulated based at least in part on variations of amplitudes of resources associated with PT-RSs of the downlink transmission, and/or the like. In some aspects, the UE may estimate a CPE based at least in part on the amplitude-modulated PT-RSs. In some aspects, the UE may attempt (e.g., after estimating the CPE) to extract data from the amplitude-modulated PT-RSs.

In some aspects, the UE may perform (e.g., on a downlink transmission) minimum mean square error (MMSE) equalization on the downlink transmission to produce a first stream associated with the first layer and a second stream associated with the second layer. The UE may aggregate, for symbols having at least one resource allocated for amplitude-modulated PT-RSs, signals received via resources allocated for amplitude-modulated PT-RSs. The UE may generate, based at least in part on aggregated signals received via the resources allocated for amplitude-modulated PT-RSs, complex coefficients for the respective symbols having at least one resource allocated for amplitude-modulated PT-RSs. Based at least in part on the complex coefficients, the UE may determine CPE for the respective symbols having at least one resource allocated for amplitude-modulated PT-RSs. In some aspects, the UE may determine, based at least in part on the CPEs, common channel phase estimates for the first stream and the second stream.

In some aspects, the UE may apply (e.g., on an uplink transmission) an amplitude to a signal to be transmitted via the first layer based at least in part on data to be transmitted on a set of resources allocated for the amplitude-modulated PT-RSs. The UE may also apply a phase to the signal to be transmitted based at least in part on a known PT-RS sequence to be transmitted on the set of resources allocated for the amplitude-modulated PT-RSs.

In some aspects, the UE may remove a known PT-RS sequence, based at least in part on phases of the amplitude-modulated PT-RSs, from a portion of the downlink transmission received on resources allocated to the amplitude-modulated PT-RSs. The UE may correct a channel effect for the portion of the downlink transmission based at least in part on, for example, DMRSs. The UE may perform antenna combining and signal equalization for the portion of the downlink transmission and then perform soft metric extraction to extract data that is indicated by amplitudes of the amplitude-modulated PT-RSs.

In some aspects, the UE may remove a known PT-RS sequence, based at least in part on phases of the amplitude-modulated PT-RSs, from the portion of the downlink transmission. The UE may correct the channel effect for the portion of the downlink transmission based at least in part on, for example, DMRSs. The UE may aggregate the portion of the downlink transmission received on the resources allocated to the amplitude-modulated PT-RSs to represent an equivalent phasor and use the equivalent phasor to estimate a CPE for the downlink transmission.

In some aspects, the UE may decode data that is transmitted on resources associated with the amplitude-modulated PT-RSs. For example, the UE may decode the data based at least in part on a configured MCS for amplitude-modulated PT-RSs, based at least in part on a configured difference of an MCS for amplitude-modulated PT-RSs and an MCS for other data of uplink transmissions or downlink transmissions, and/or the like.

Based at least in part on the UE indicating the capability to communicate using amplitude-modulated PT-RSs and/or the UE requesting to communicate using amplitude-modulated PT-RSs, the base station and/or the UE may conserve computing, communication, and/or network resources that may otherwise have been used to schedule additional resources to compensate for using dedicated resources for PT-RSs.

As indicated above, FIG. 4 is provided as an example. Other examples may differ from what is described with respect to FIG. 4.

Figure 5:
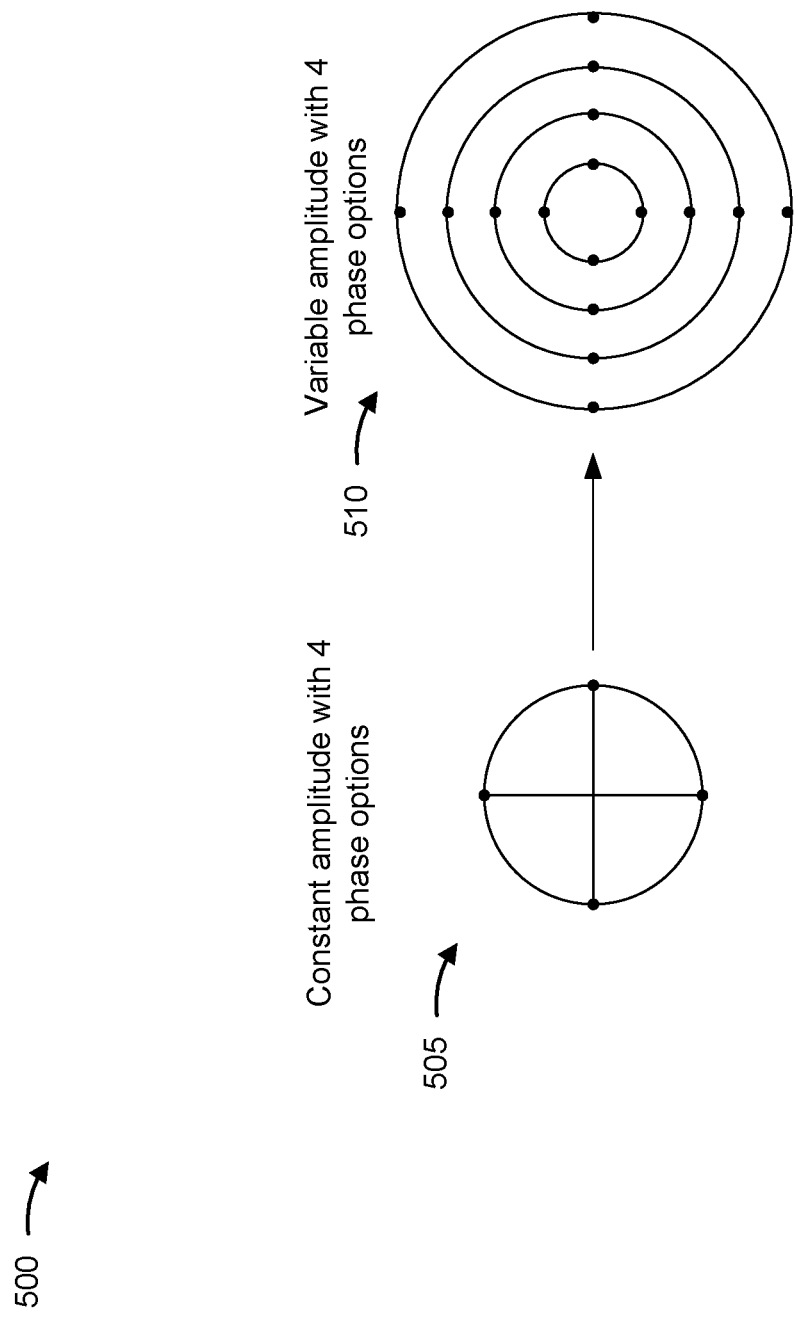
FIG. 5 is a diagram illustrating an example of amplitude-modulated phase tracking reference signals, in accordance with the present disclosure.

FIG. 5 is a diagram illustrating an example 500 of amplitude-modulated PT-RSs, in accordance with the present disclosure.

As shown in FIG. 5, and by reference number 505, a PT-RS may be transmitted with a constant amplitude with four phase options. The PT-RS with the constant amplitude may carry a Gold sequence based at least in part on phases of the PT-RS (e.g., using a sequence of the four phase options). However, the PT-RS having the constant amplitude may only carry the Gold sequence and may be a dedicated PT-RS that does not carry additional data.

As shown by reference number 510, a PT-RS may be transmitted with variable amplitude with the four phase options. In this way, the PT-RS may carry the Gold sequence via the phases of the PT-RS and may carry additional data via the amplitudes of the PT-RS.

In some aspects, a transmitting device (base station 110, UE 120, and/or the like) may modulate amplitudes of the PT-RS symbols to carry the additional data. For example, the transmitting device may configure PT-RS amplitudes using an M-amplitude shift keying (M-ASK) constellation that is based at least in part on incoming data bits to transmit. The transmitting device may configure phases of the PT-RSs based at least in part on a predefined, known Quadrature Phase Shift Keying (QPSK) symbols sequence defined for PT-RSs in a communication standard (e.g., based at least in part on configuration by a network). In some aspects, the PT-RSs may be transmitted using an amplitude phase shift keying (APSK) constellation having multiple rings (e.g., representing amplitudes) and four QPSK phase options on each ring.

A receiving device (e.g., UE 120, base station 110, and/or the like) may receive and process the PT-RSs (e.g., now amplitude-modulated PT-RSs). The receiving the device may remove the known PT-RS sequence (e.g., by isolating phases of the PT-RSs) and DMRSs may be used to estimate and/or correct a channel effect for each PT-RS symbol. The receiving device may aggregate, for each symbol, PT-RSs to determine an equivalent phasor. Each phasor may represent a CPE per symbol that is based at least in part on, for example, phase noise. The phasors may be used to refine a common channel phase estimate per symbol. The receiving device may use antenna combining and signal equalization to determine a combined and equalized signal amplitude. The receiving device may use the combined and equalized signal amplitude to perform soft metric extraction to extract the amplitude-modulated on the amplitudes of the PT-RSs.

In this way, the determination of the equivalent phasor and/or CPE may be determined without, or with insignificant, negative effects from having amplitude modulation applied to the PT-RSs (e.g., based at least in part on the equivalent phasors on each symbol having an average amplitude that is defined by an average amplitude of the amplitude-modulated PT-RSs).

As indicated above, FIG. 5 is provided as an example. Other examples may differ from what is described with respect to FIG. 5.

Figure 6:
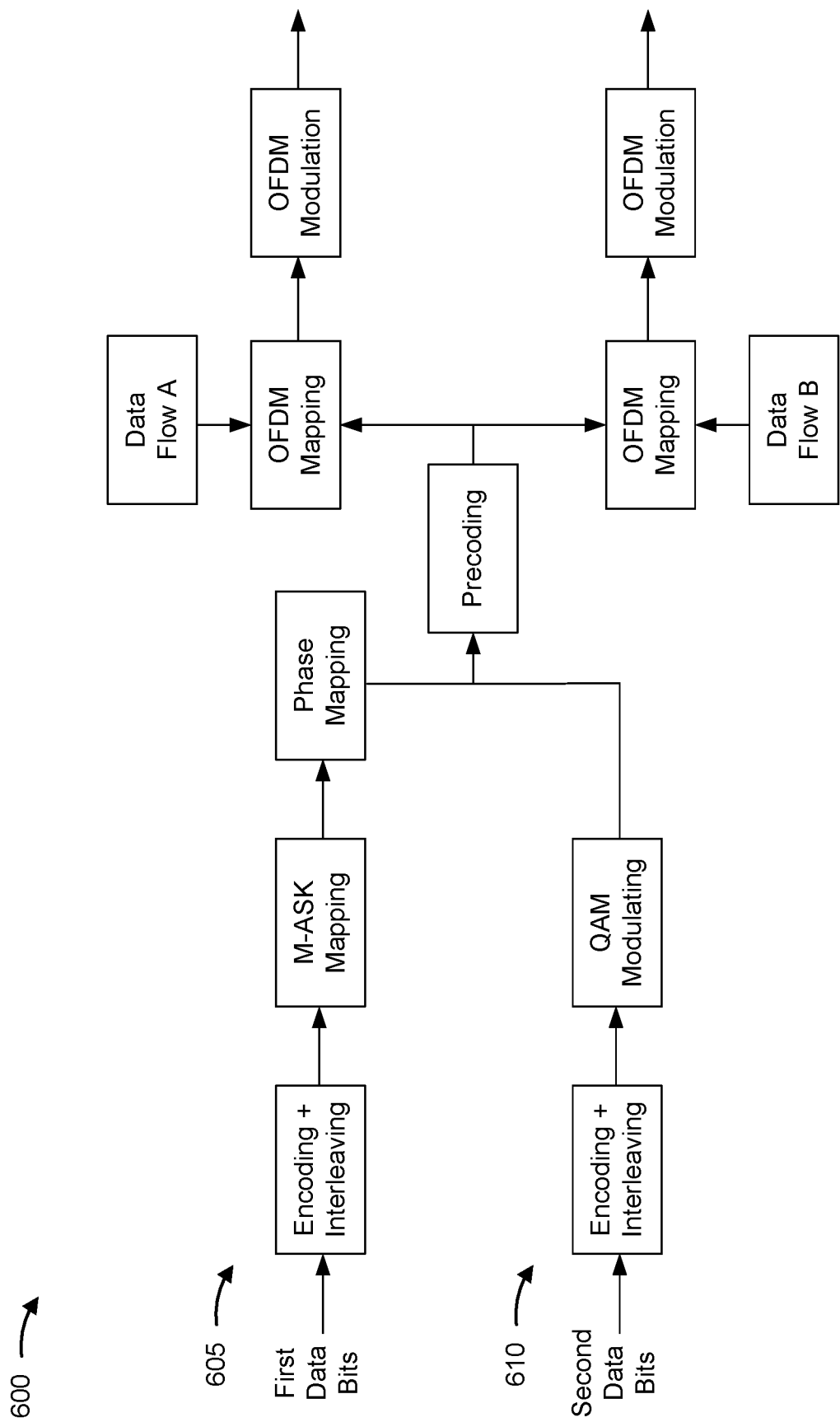
FIG. 6 is a diagram illustrating an example of configuring a transmission of amplitude-modulated phase tracking reference signals, in accordance with the present disclosure.

FIG. 6 is a diagram illustrating an example 600 of configuring a transmission of amplitude-modulated PT-RSs, in accordance with the present disclosure.

As shown in FIG. 6, and by reference number 605, a transmitting device (e.g., base station 110, UE 120, and/or the like) may receive first data bits for transmission to a receiving device (e.g., UE 120, base station 110, and/or the like) using amplitude-modulated PT-RSs on a first layer on a set of resources. The transmitting device may encode and interleave the first data bits, based at least in part on an MCS for the PT-RSs, for transmission via a resource (time symbol 1 and frequency k) allocated to the PT-RSs. The transmitting device may perform M-ASK mapping to map the data bits to amplitudes of the PT-RSs (e.g., for transmission as a signal having a constant phase (e.g., a phase of zero)). The transmitting device may perform phase mapping to apply, to the signal, a known pilot phase defined by a PT-RS sequence (e.g., as indicated in a communication standard).

As shown by reference number 610, the transmitting device may receive second data bits for transmission to a receiving device (e.g., UE 120, base station 110, and/or the like) on a second layer using the set of resources (e.g., the same set of resources on which the amplitude-modulated PT-RSs are carried on the first layer). The transmitting device may encode and interleave the second data bits, based at least in part on an MCS for data resources, for transmission via a resource (time symbol 1 and frequency k) allocated to the PT-RSs. In some aspects (e.g., in which the first layer and the second layer use a single codeword), the transmitting device may use a single and/or joint encoder to encode the first bits and the second bits. The transmitting device may perform Quadrature Amplitude Modulation (QAM) modulating on the encoded and interleaved second data bits.

The transmitting device may precode the first data bits and the second data bits. For example, the UE may apply a precoding matrix (e.g., a 2 by 2 precoding matrix). The precoding matrix may be a same precoding matrix that is used to precode data (e.g., PDSCH data or PUSCH data) to be transmitted with the first bit and the second bits.

The transmitting device may perform OFDM mapping to the first data bits and data flow A (e.g., data to be transmitted on additional resources of the first layer). The transmitting device may also perform OFDM modulation to the first data bits and the data flow A after OFDM mapping. Similarly, the transmitting device may perform OFDM mapping to the second data bits and data flow B (e.g., data to be transmitted on additional resources of the second layer). The transmitting device may also perform OFDM modulation to the second data bits and the data flow B after OFDM mapping.

The transmitting device may send the first bits, data flow A, the second bits, and data flow B to be transmitted (e.g., via an antenna, a transmission chain, and/or the like) to the receiving device.

As indicated above, FIG. 6 is provided as an example. Other examples may differ from what is described with respect to FIG. 6.

Figure 7:
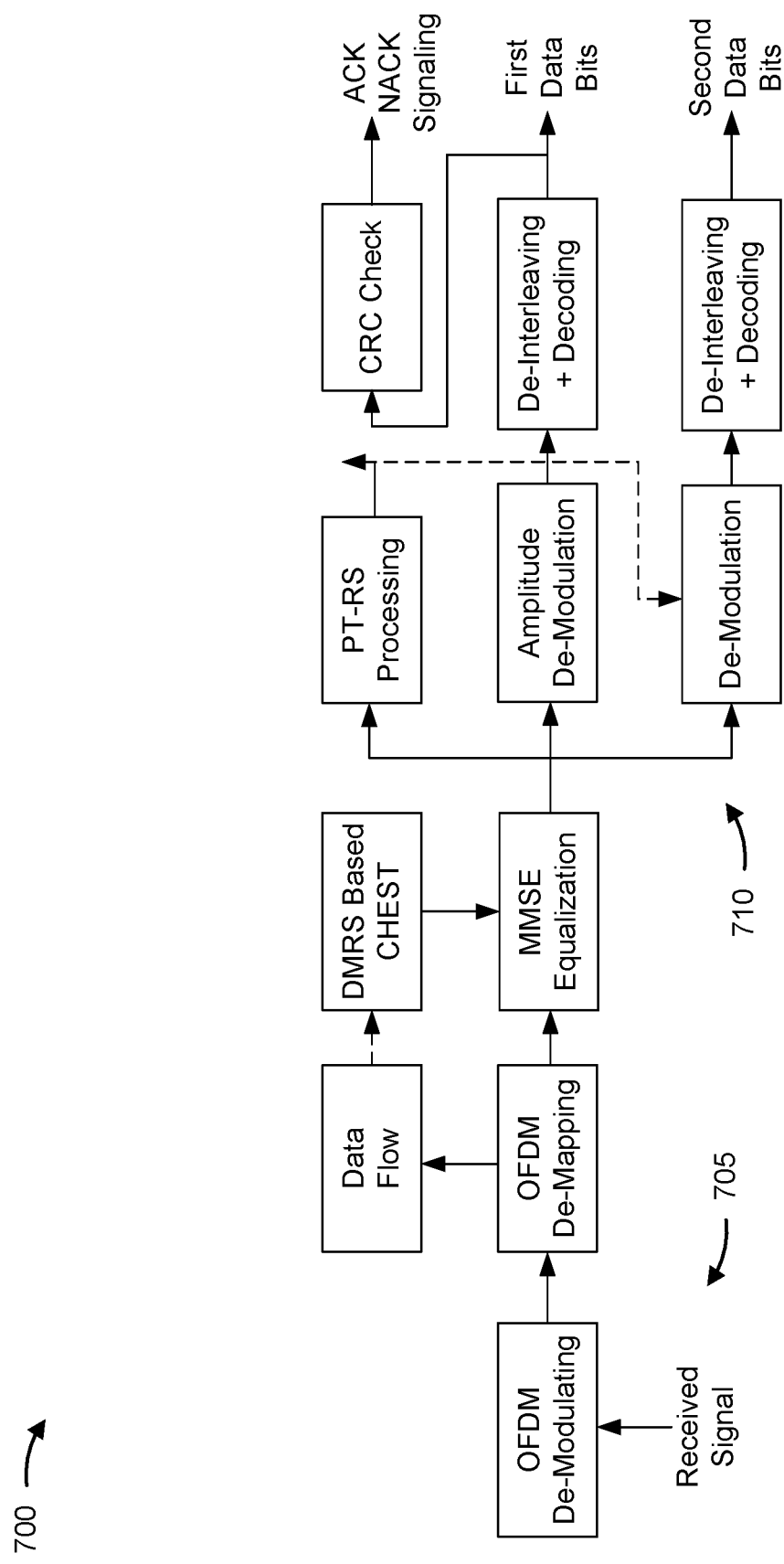
FIG. 7 is a diagram illustrating an example of receiving a transmission with amplitude-modulated phase tracking reference signals, in accordance with the present disclosure.

FIG. 7 is a diagram illustrating an example 700 of receiving a transmission with amplitude-modulated PT-RSs, in accordance with the present disclosure.

As shown in FIG. 7, and by reference number 705, a receiving device may receive a single signal from a transmitting device. The receiving device may perform OFDM de-modulation to demodulate the signal based at least in part on, for example, the MCS for the PT-RSs and/or the MCS for additional data on a first layer and a second layer. The receiving device may perform OFDM de-mapping to de-map the signal and separate signals transmitted via the PT-RS symbols from the signals transmitted via symbols of the additional data on the first layer and/or on the second layer. The additional data (Data flow) may be used to determine a DMRS based channel estimation. The receiving device may use the DMRS based channel estimation to perform MMSE equalization.

As shown by reference number 710, the receiving device may separate PT-RSs from the additional data transmitted on the first layer and/or the second layer (e.g., on the same set of resources). The receiving device may perform PT-RS processing and amplitude demodulation on signals received via PT-RS resources. The receiving device may perform demodulation on signals received via the second stream using the same set of resources as the PT-RSs on the first stream. In some aspects, the receiving device may perform amplitude data processing and/or de-interleaving and decoding on the signals received on the first stream via the PT-RS resources and may (e.g., in parallel) perform PT-RS based CPE estimation. This may not add latency to PDSCH processing. In some aspects, the receiving device may also process (e.g., demodulate, de-interleave, and/or decode) the signals (e.g., in parallel) that are received via the second stream using the same set of resources.

The receiving device may determine a phasor for each time symbol (e.g., and for each antenna within a time symbol) that is based at least in a part on the PT-RS processing. The phasors can be used to determine a channel phase error. The receiving device may use phasors to determine a channel phase error to refine a channel estimation (e.g., the DMRS based channel estimation) for decoding the signals received via the second stream using the same set of resources as the PT-RSs on the first stream.

The receiving device may use the data bits (e.g., for an application of the receiver, to generate another data packet for forwarding, and/or the like). The receiving device may perform a CRC check on the signals received via the first stream and signals received via the second stream and may further provide ACK/NACK signaling for the signals received via the first stream and for the signals received via the second stream.

As indicated above, FIG. 7 is provided as an example. Other examples may differ from what is described with respect to FIG. 7.

Figure 8:
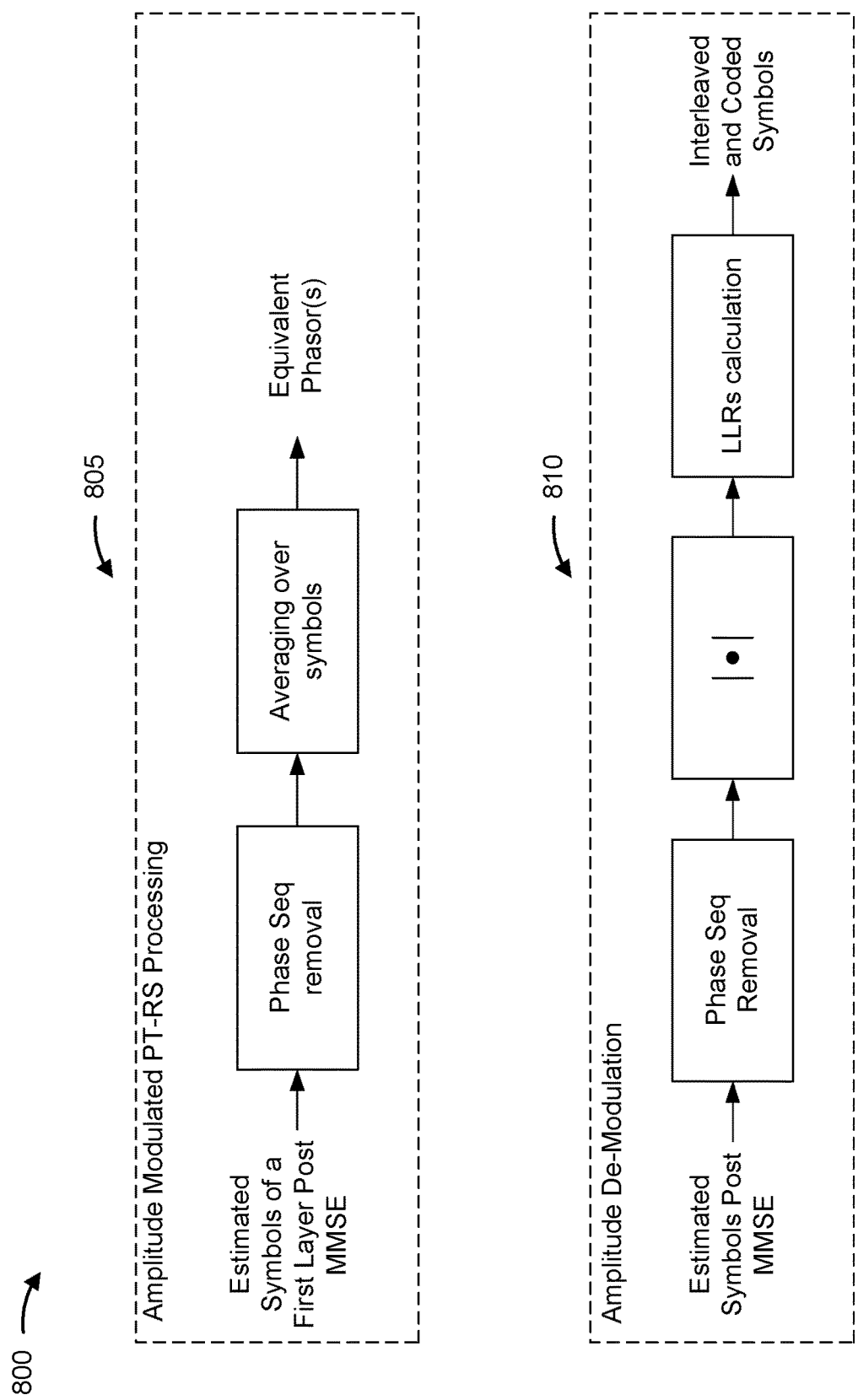
FIG. 8 is a diagram illustrating an example of processing and performing amplitude demodulation for amplitude-modulated phase tracking reference signals, in accordance with the present disclosure.

FIG. 8 is a diagram illustrating an example 800 of processing and performing amplitude demodulation for amplitude-modulated PT-RSs, in accordance with the present disclosure.

As shown in FIG. 8, and by reference number 805, the receiving device may perform phase sequence removal on estimated symbols and/or resources (e.g., associated with amplitude-modulated PT-RSs) of a first layer after performing MMSE. The receiving device may perform channel removal (e.g., channel correction) on the PT-RS signal based at least in part on DMRS based channel estimate coefficients. The receiving device may perform an averaging of PT-RS signals (e.g., having channel correction applied) of one or more (e.g., all) PT-RS resources per symbol. The receiving device may average the aggregated PT-RS signals over multiple symbols to determine one or more equivalent phasors for the PT-RSs symbols of the multiple symbols.

In this way, the receiving device may estimate phase noise, residual frequency offset, and/or the like based at least in part on the amplitude-modulated PT-RSs. The receiving device may use estimated phase differences to determine phase noise and/or to address residual frequency offset (e.g., between symbols) prior to demodulating and/or decoding additional data transmitted with the amplitude-modulated PT-RSs.

As shown by reference number 810, the receiving device may perform amplitude de-modulation on estimated symbols and/or resources (e.g., associated with amplitude-modulated PT-RSs) of a first layer after performing MMSE. The receiving device may remove a known phase sequence from the amplitude-modulated PT-RS signals. This may isolate amplitude components of the PT-RS signals. The receiving device may perform equalization and maximal ratio combining (MRC) based at least in part on the DMRS based channel estimate coefficients. The receiving device may determine amplitudes of the PT-RS signals (e.g., based at least in part on magnitudes of the signals). The receiving device may perform a log-likelihood ratio (LLR) calculation to determine values of the amplitudes of the PT-RS signals for de-interleaving and decoding the signals received via the estimated symbols and/or resources associated with amplitude-modulated PT-RSs.

As indicated above, FIG. 8 is provided as an example. Other examples may differ from what is described with respect to FIG. 8.

Figure 9:
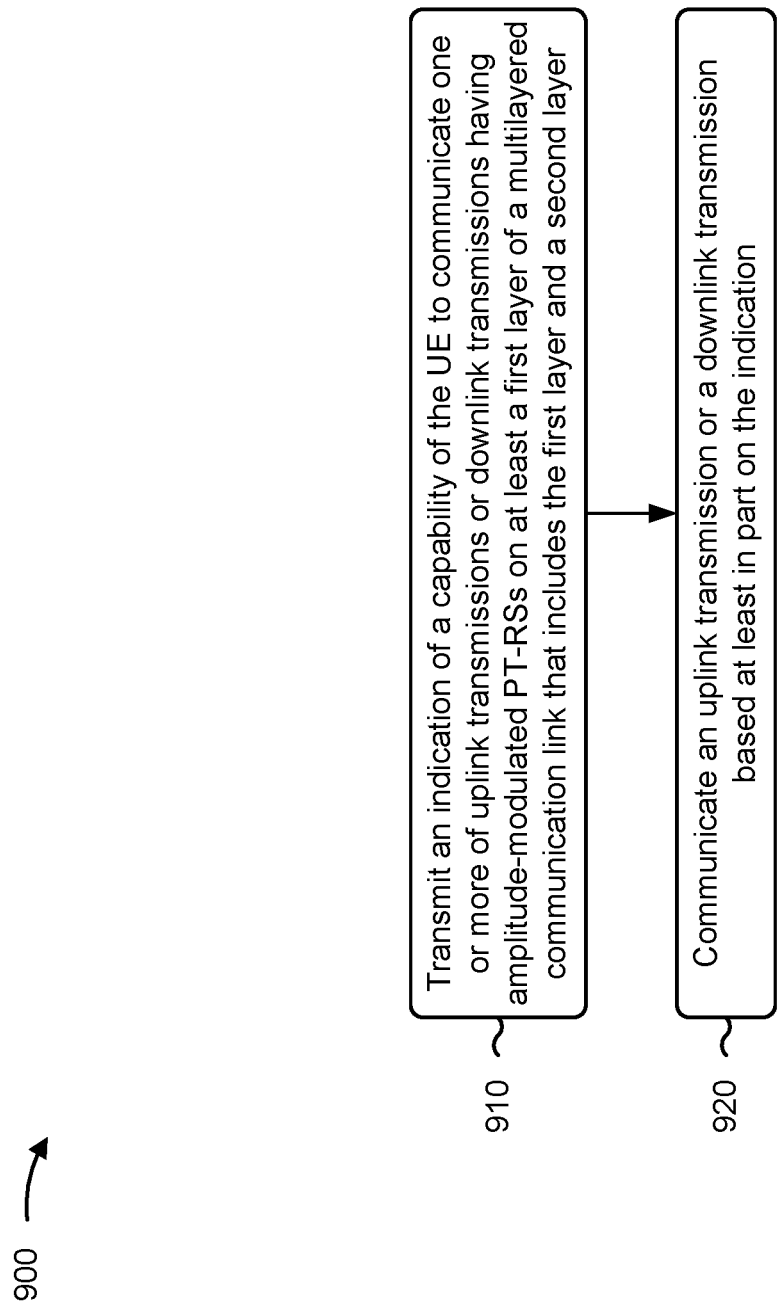
FIG. 9 is a diagram illustrating an example process performed, for example, by a user equipment, in accordance with the present disclosure.

FIG. 9 is a diagram illustrating an example process 900 performed, for example, by a UE, in accordance with the present disclosure. Example process 900 is an example where the UE (e.g., UE 120 and/or the like) performs operations associated with amplitude-modulated PT-RSs for a multilayer communication link.

As shown in FIG. 9, in some aspects, process 900 may include transmitting an indication of a capability of the UE to communicate one or more of uplink transmissions or downlink transmissions having amplitude-modulated PT-RSs on at least a first layer of a multilayered communication link that includes the first layer and a second layer (block 910). For example, the UE (e.g., using transmit processor 264, controller/processor 280, memory 282, and/or the like) may transmit an indication of a capability of the UE to communicate one or more of uplink transmissions or downlink transmissions having amplitude-modulated PT-RSs on at least a first layer of a multilayered communication link that includes the first layer and a second layer, as described above.

As further shown in FIG. 9, in some aspects, process 900 may include communicating an uplink transmission or a downlink transmission based at least in part on the indication (block 920). For example, the UE (e.g., using receive processor 258, transmit processor 264, controller/processor 280, memory 282, and/or the like) may communicate an uplink transmission or a downlink transmission based at least in part on the indication, as described above.

Process 900 may include additional aspects, such as any single aspect or any combination of aspects described below and/or in connection with one or more other processes described elsewhere herein.

In a first aspect, the amplitude-modulated PT-RSs include a PT-RS sequence indicated by phases of the amplitude-modulated PT-RSs and data that is indicated by amplitudes of the amplitude-modulated PT-RSs.

In a second aspect, alone or in combination with the first aspect, communicating the uplink transmission or the downlink transmission includes receiving the downlink transmission or transmitting the uplink transmission with amplitude-modulated PT-RSs on a set of resources on the first layer, and receiving the downlink transmission or transmitting the uplink transmission includes receiving the downlink transmission or transmitting the uplink transmission with amplitude-modulated PT-RSs on the set of resources on the second layer, or receiving the downlink transmission or transmitting the uplink transmission with data on the set of resources on the second layer.

In a third aspect, alone or in combination with one or more of the first and second aspects, communicating the downlink transmission includes receiving the downlink transmission, and receiving the downlink transmission includes performing MMSE equalization on the downlink transmission to produce a first stream associated with the first layer and a second stream associated with the second layer, aggregating, for symbols having at least one resource allocated for amplitude-modulated PT-RSs, signals received via resources allocated for amplitude-modulated PT-RSs, generating, based at least in part on aggregated signals received via the resources allocated for amplitude-modulated PT-RSs, complex coefficients for the respective symbols having at least one resource allocated for amplitude-modulated PT-RSs, and determining, based at least in part on the complex coefficients, common phase errors for the respective symbols having at least one resource allocated for amplitude-modulated PT-RSs.

In a fourth aspect, alone or in combination with one or more of the first through third aspects, process 900 includes determining, based at least in part on the common phase errors, common channel phase estimates for the first stream and the second stream.

In a fifth aspect, alone or in combination with one or more of the first through fourth aspects, communicating the uplink transmission or the downlink transmission includes transmitting the uplink transmission, and transmitting the uplink transmission includes applying an amplitude, based at least in part on data to be transmitted on a set of resources allocated for the amplitude-modulated PT-RSs, to a signal to be transmitted via the first layer, and applying a phase, based at least in part on a known PT-RS sequence to be transmitted on the set of resources allocated for the amplitude-modulated PT-RSs, to the signal to be transmitted via the first layer.

In a sixth aspect, alone or in combination with one or more of the first through fifth aspects, the first layer is associated with a first DMRS port that has a signal strength that is higher than a signal strength of a DMRS port that is associated with the second layer.

In a seventh aspect, alone or in combination with one or more of the first through sixth aspects, communicating the uplink transmission or the downlink transmission includes transmitting the uplink transmission or receiving the downlink transmission based at least in part on a first codeword for data carried via a set of resources allocated for amplitude-modulated PT-RSs on the first layer, and a second codeword that is different from the first codeword, for data carried via the set of resources on the second layer.

In an eighth aspect, alone or in combination with one or more of the first through seventh aspects, the second codeword is a same codeword used for data carried via an additional set of resources allocated for data on the second layer.

In a ninth aspect, alone or in combination with one or more of the first through eighth aspects, data that is transmitted on resources associated with amplitude-modulated PT-RSs has a CRC that is different from one or more CRCs associated with other data of the uplink transmission or the downlink transmission.

In a tenth aspect, alone or in combination with one or more of the first through ninth aspects, data transmitted on resources associated with the amplitude-modulated PT-RSs is associated with a dedicated acknowledgement/negative acknowledgment (ACK/NACK) bit that is different from one or more ACK/NACK bits that are associated with other data communicated via the uplink transmission or the downlink transmission.

In an eleventh aspect, alone or in combination with one or more of the first through tenth aspects, process 900 includes reporting a NACK for the amplitude-modulated PT-RSs and receiving a repetition of the amplitude-modulated PT-RSs via a subsequent PT-RS resource.

In a twelfth aspect, alone or in combination with one or more of the first through eleventh aspects, process 900 includes transmitting a request for an MCS for symbols associated with the amplitude-modulated PT-RSs.

In a thirteenth aspect, alone or in combination with one or more of the first through twelfth aspects, transmitting the request for the MCS includes transmitting the request for the MCS with a request for amplitude-modulated PT-RSs.

In a fourteenth aspect, alone or in combination with one or more of the first through thirteenth aspects, process 900 includes receiving an indication of an MCS for symbols associated with the amplitude-modulated PT-RSs.

In a fifteenth aspect, alone or in combination with one or more of the first through fourteenth aspects, the indication of the MCS is based at least in part on feedback signaling associated with a previous downlink transmission having amplitude-modulated PT-RSs.

In a sixteenth aspect, alone or in combination with one or more of the first through fifteenth aspects, receiving the indication of the MCS includes receiving the indication of the MCS via DCI, RRC signaling, or one or more MAC CEs.

In a seventeenth aspect, alone or in combination with one or more of the first through sixteenth aspects, the indication of the MCS indicates a difference between the MCS for symbols associated with the amplitude-modulated PT-RSs and an MCS for symbols associated with other data of the uplink transmission or the downlink transmission.

In an eighteenth aspect, alone or in combination with one or more of the first through seventeenth aspects, process 900 includes decoding data that is multiplexed with a PT-RS sequence on resources associated with the amplitude-modulated PT-RSs based at least in part on a configured MCS for amplitude-modulated PT-RSs of downlink transmissions, or a configured difference between an MCS for amplitude-modulated PT-RSs and an MCS for other data of downlink transmissions.

In a nineteenth aspect, alone or in combination with one or more of the first through eighteenth aspects, transmitting the indication of the capability of the UE includes one or more of transmitting the indication via one or more of RRC signaling, a MAC CE, or a PUCCH message, or transmitting a request, for an uplink transmission or a downlink transmission, for amplitude-modulated PT-RSs.

In a twentieth aspect, alone or in combination with one or more of the first through nineteenth aspects, process 900 includes communicating the uplink transmission or the downlink transmission based at least in part on an assumption, based at least in part on transmitting the request, that the uplink transmission or the downlink transmission is to be transmitted with amplitude-modulated PT-RSs.

In a twenty-first aspect, alone or in combination with one or more of the first through twentieth aspects, process 900 includes receiving configuration information that indicates that a base station is to provide an indication of whether amplitude-modulated PT-RSs are enabled.

In a twenty-second aspect, alone or in combination with one or more of the first through twenty-first aspects, process 900 includes receiving an indication to communicate based at least in part on amplitude-modulated PT-RSs.

In a twenty-third aspect, alone or in combination with one or more of the first through twenty-second aspects, receiving the indication includes receiving the indication via one or more of a DCI message, a MAC CE, or RRC signaling.

In a twenty-fourth aspect, alone or in combination with one or more of the first through twenty-third aspects, process 900 includes receiving the downlink transmission; determining, based at least in part on variations of amplitudes of resources associated with PT-RSs of the downlink transmission, that the downlink transmission has amplitude-modulated PT-RSs; estimating, based at least in part on the amplitude-modulated PT-RSs, a common phase error for the downlink transmission; and attempting to extract data from the amplitude-modulated PT-RSs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
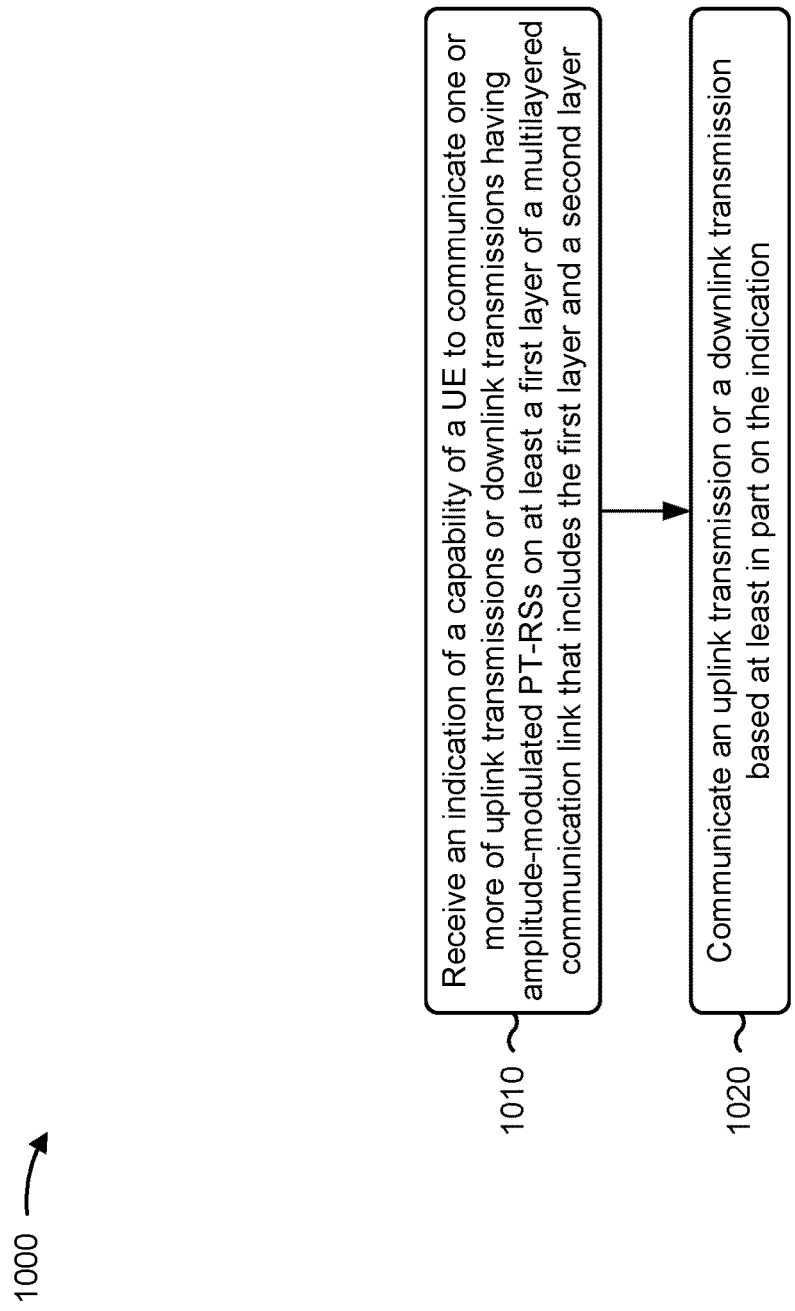
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110 and/or the like) performs operations associated with amplitude-modulated PT-RSs for a multilayer communication link.

As shown in FIG. 10, in some aspects, process 1000 may include receiving an indication of a capability of a UE to communicate one or more of uplink transmissions or downlink transmissions having amplitude-modulated PT-RSs on at least a first layer of a multilayered communication link that includes the first layer and a second layer (block 1010). For example, the base station (e.g., using receive processor 238, controller/processor 240, memory 242, and/or the like) may receive an indication of a capability of a UE to communicate one or more of uplink transmissions or downlink transmissions having amplitude-modulated PT-RSs on at least a first layer of a multilayered communication link that includes the first layer and a second layer, as described above.

As further shown in FIG. 10, in some aspects, process 1000 may include communicating an uplink transmission or a downlink transmission based at least in part on the indication (block 1020). For example, the base station (e.g., using transmit processor 220, receive processor 238, controller/processor 240, memory 242, and/or the like) may communicate an uplink transmission or a downlink transmission based at least in part on the indication, as described above.

Process 1000 may include additional aspects, such as any single aspect or any combination of aspects described below and/or in connection with one or more other processes described elsewhere herein.

In a first aspect, process 1000 includes determining whether to transmit the downlink transmission with amplitude-modulated PT-RSs, or to indicate to the UE to transmit an uplink transmission, based at least in part on one or more of: an amount of data buffered for the downlink transmission or the uplink transmission, a size of a resource grant associated with the downlink transmission or the uplink transmission, a reference signal received power associated with the UE, or movement of the UE.

In a second aspect, alone or in combination with the first aspect, the amplitude-modulated PT-RSs include a PT-RS sequence indicated by phases of the amplitude-modulated PT-RSs, and data that is indicated by amplitudes of the amplitude-modulated PT-RSs.

In a third aspect, alone or in combination with one or more of the first and second aspects, communicating the uplink transmission or the downlink transmission includes transmitting the downlink transmission or receiving the uplink transmission with amplitude-modulated PT-RSs on a set of resources on the first layer, and transmitting the downlink transmission or receiving the uplink transmission includes transmitting the downlink transmission or receiving the uplink transmission with amplitude-modulated PT-RSs on the set of resources on the second layer, or transmitting the downlink transmission or receiving the uplink transmission with data on the set of resources on the second layer.

In a fourth aspect, alone or in combination with one or more of the first through third aspects, communicating the downlink transmission includes receiving the uplink transmission, and receiving the uplink transmission includes performing MMSE equalization on the uplink transmission to produce a first stream associated with the first layer and a second stream associated with the second layer; aggregating, for symbols having at least one resource allocated for amplitude-modulated PT-RSs, signals received via resources allocated for amplitude-modulated PT-RSs, generating, based at least in part on aggregated signals received via the resources allocated for amplitude-modulated PT-RSs, complex coefficients for the respective symbols having at least one resource allocated for amplitude-modulated PT-RSs, and determining, based at least in part on the complex coefficients, common phase errors for the respective symbols having at least one resource allocated for amplitude-modulated PT-RSs.

In a fifth aspect, alone or in combination with one or more of the first through fourth aspects, process 1000 includes determining, based at least in part on the common phase errors, common channel phase estimates for the first stream and the second stream.

In a sixth aspect, alone or in combination with one or more of the first through fifth aspects, communicating the uplink transmission or the downlink transmission includes transmitting the downlink transmission, and transmitting the downlink transmission includes applying an amplitude, based at least in part on data to be transmitted on a set of resources allocated for the amplitude-modulated PT-RSs, to a signal to be transmitted via the first layer, and applying a phase, based at least in part on a known PT-RS sequence to be transmitted on the set of resources allocated for the amplitude-modulated PT-RSs, to the signal to be transmitted via the first layer.

In a seventh aspect, alone or in combination with one or more of the first through sixth aspects, the first layer is associated with a first DMRS port that has a signal strength that is higher than a signal strength of a DMRS port that is associated with the second layer.

In an eighth aspect, alone or in combination with one or more of the first through seventh aspects, communicating the uplink transmission or the downlink transmission includes transmitting the downlink transmission or receiving the uplink transmission based at least in part on a first codeword for data carried via a set of resources allocated for amplitude-modulated PT-RSs on the first layer, and a second codeword that is different from the first codeword, for data carried via the set of resources on the second layer.

In a ninth aspect, alone or in combination with one or more of the first through eighth aspects, the second codeword is a same codeword used for data carried via an additional set of resources allocated for data on the second layer.

In a tenth aspect, alone or in combination with one or more of the first through ninth aspects, data that is transmitted on resources associated with amplitude-modulated PT-RSs has a CRC that is different from one or more CRCs associated with other data of the uplink transmission or the downlink transmission.

In an eleventh aspect, alone or in combination with one or more of the first through tenth aspects, data transmitted on resources associated with the amplitude-modulated PT-RSs is associated with a dedicated ACK/NACK bit that is different from one or more ACK/NACK bits that are associated with other data communicated via the uplink transmission or the downlink transmission.

In a twelfth aspect, alone or in combination with one or more of the first through eleventh aspects, process 1000 includes receiving a NACK for the amplitude-modulated PT-RSs; and transmitting a repetition of the amplitude-modulated PT-RSs via a subsequent PT-RS resource.

In a thirteenth aspect, alone or in combination with one or more of the first through twelfth aspects, process 1000 includes receiving a request for an MCS for symbols associated with the amplitude-modulated PT-RSs.

In a fourteenth aspect, alone or in combination with one or more of the first through thirteenth aspects, receiving the request for the MCS includes receiving the request for the MCS with a request for amplitude-modulated PT-RSs.

In a fifteenth aspect, alone or in combination with one or more of the first through fourteenth aspects, process 1000 includes transmitting an indication of an MCS for symbols associated with the amplitude-modulated PT-RSs.

In a sixteenth aspect, alone or in combination with one or more of the first through fifteenth aspects, the indication of the MCS is based at least in part on feedback signaling associated with a previous uplink transmission having amplitude-modulated PT-RSs.

In a seventeenth aspect, alone or in combination with one or more of the first through sixteenth aspects, transmitting the indication of the MCS includes transmitting the indication of the MCS via DCI, RRC signaling, or one or more MAC CEs.

In an eighteenth aspect, alone or in combination with one or more of the first through seventeenth aspects, the indication of the MCS indicates a difference between the MCS for symbols associated with the amplitude-modulated PT-RSs and an MCS for symbols associated with other data of the uplink transmission or the downlink transmission.

In a nineteenth aspect, alone or in combination with one or more of the first through eighteenth aspects, process 1000 includes decoding data that is multiplexed with a PT-RS sequence on resources associated with the amplitude-modulated PT-RSs based at least in part on a configured MCS for amplitude-modulated PT-RSs of uplink transmissions; or a configured difference between an MCS for amplitude-modulated PT-RSs and an MCS for other data of uplink transmissions.

In a twentieth aspect, alone or in combination with one or more of the first through nineteenth aspects, receiving the indication of the capability of the UE includes one or more of receiving the indication via one or more of RRC signaling, a MAC CE, or a PUCCH message, or receiving a request, for an uplink transmission or a downlink transmission, for amplitude-modulated PT-RSs.

In a twenty-first aspect, alone or in combination with one or more of the first through twentieth aspects, process 1000 includes communicating the uplink transmission or the downlink transmission based at least in part on an assumption, based at least in part on receiving the request, that the uplink transmission or the downlink transmission is to be transmitted with amplitude-modulated PT-RSs.

In a twenty-second aspect, alone or in combination with one or more of the first through twenty-first aspects, process 1000 includes transmitting configuration information that indicates that the base station is to provide an indication of whether amplitude-modulated PT-RSs are enabled.

In a twenty-third aspect, alone or in combination with one or more of the first through twenty-second aspects, process 1000 includes transmitting an indication to communicate based at least in part on amplitude-modulated PT-RSs.

In a twenty-fourth aspect, alone or in combination with one or more of the first through twenty-third aspects, transmitting the indication includes transmitting the indication via one or more of a DCI message, a MAC CE, or RRC signaling.

In a twenty-fifth aspect, alone or in combination with one or more of the first through twenty-fourth aspects, process 1000 includes receiving the uplink transmission; determining, based at least in part on variations of amplitudes of resources associated with PT-RSs of the uplink transmission, that the uplink transmission has amplitude-modulated PT-RSs; estimating, based at least in part on the amplitude-modulated PT-RSs, a common phase error for the uplink transmission; and attempting to extract data from the amplitude-modulated PT-RSs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: transmitting an indication of a capability of the UE to communicate one or more of uplink transmissions or downlink transmissions having amplitude-modulated phase tracking reference signals (PT-RSs) on at least a first layer of a multilayered communication link that has a first layer and a second layer; and communicating an uplink transmission or a downlink transmission based at least in part on the indication.

Aspect 2: The method of Aspect 1, wherein the amplitude-modulated PT-RSs comprise: a PT-RS sequence indicated by phases of the amplitude-modulated PT-RSs, and data that is indicated by amplitudes of the amplitude-modulated PT-RSs.

Aspect 3: The method of any of Aspects 1-2, wherein communicating the uplink transmission or the downlink transmission comprises receiving the downlink transmission or transmitting the uplink transmission with amplitude-modulated PT-RSs on a set of resources on the first layer, and wherein receiving the downlink transmission or transmitting the uplink transmission comprises: receiving the downlink transmission or transmitting the uplink transmission with amplitude-modulated PT-RSs on the set of resources on the second layer, or receiving the downlink transmission or transmitting the uplink transmission with data on the set of resources on the second layer.

Aspect 4: The method of any of Aspects 1-3, wherein communicating the downlink transmission comprises receiving the downlink transmission, and wherein receiving the downlink transmission comprises: performing minimum mean square error equalization on the downlink transmission to produce a first stream associated with the first layer and a second stream associated with the second layer; aggregating, for symbols having at least one resource allocated for amplitude-modulated PT-RSs, signals received via resources allocated for amplitude-modulated PT-RSs; generating, based at least in part on aggregated signals received via the resources allocated for amplitude-modulated PT-RSs, complex coefficients for the respective symbols having at least one resource allocated for amplitude-modulated PT-RSs; and determining, based at least in part on the complex coefficients, common phase errors for the respective symbols having at least one resource allocated for amplitude-modulated PT-RSs.

Aspect 5: The method of Aspect 4, further comprising: determining, based at least in part on the common phase errors, common channel phase estimates correction coefficients for the first stream and the second stream.

Aspect 6: The method of any of Aspects 1-5, wherein communicating the uplink transmission or the downlink transmission comprises transmitting the uplink transmission, and wherein transmitting the uplink transmission comprises: applying an amplitude, based at least in part on data to be transmitted on a set of resources allocated for the amplitude-modulated PT-RSs, to a signal to be transmitted via the first layer; and applying a phase, based at least in part on a known PT-RS sequence to be transmitted on the set of resources allocated for the amplitude-modulated PT-RSs, to the signal to be transmitted via the first layer.

Aspect 7: The method of any of Aspects 1-6, wherein the first layer is associated with a first demodulation reference signal (DMRS) port that has a signal strength that is higher than a signal strength of a DMRS port that is associated with the second layer.

Aspect 8: The method of any of Aspects 1-7, wherein communicating the uplink transmission or the downlink transmission comprises: transmitting the uplink transmission or receiving the downlink transmission based at least in part on: a first codeword for data carried via a set of resources allocated for amplitude-modulated PT-RSs on the first layer, and a second codeword that is different from the first codeword, for data carried via the set of resources on the second layer.

Aspect 9: The method of Aspect 8, wherein the second codeword is a same codeword used for data carried via an additional set of resources allocated for data on the second layer.

Aspect 10: The method of any of Aspects 1-9, wherein data that is transmitted on resources associated with amplitude-modulated PT-RSs has a cyclical redundancy check (CRC) that is different from one or more CRCs associated with other data of the uplink transmission or the downlink transmission.

Aspect 11: The method of any of Aspects 1-10, wherein data transmitted on resources associated with the amplitude-modulated PT-RSs is associated with a dedicated acknowledgement/negative acknowledgment (ACK/NACK) bit that is different from one or more ACK/NACK bits that are associated with other data communicated via the uplink transmission or the downlink transmission.

Aspect 12: The method of Aspect 11, further comprising: reporting a NACK for the amplitude-modulated PT-RSs; and receiving a repetition of the amplitude-modulated PT-RSs via a subsequent PT-RS resource.

Aspect 13: The method of any of Aspects 1-12, further comprising: transmitting a request for a modulation and coding scheme for symbols associated with the amplitude-modulated PT-RSs.

Aspect 14: The method of Aspect 13, wherein transmitting the request for the modulation and coding scheme comprises: transmitting the request for the modulation and coding scheme with a request for amplitude-modulated PT-RSs.

Aspect 15: The method of any of Aspects 1-14, further comprising: receiving an indication of a modulation and coding scheme for symbols associated with the amplitude-modulated PT-RSs.

Aspect 16: The method of Aspect 15, wherein the indication of the modulation and coding scheme is based at least in part on feedback signaling associated with a previous downlink transmission having amplitude-modulated PT-RSs.

Aspect 17: The method of any of Aspects 15-16, wherein receiving the indication of the modulation and coding scheme comprises: receiving the indication of the modulation and coding scheme via downlink control information, radio resource control signaling, or one or more medium access control control elements.

Aspect 18: The method of any of Aspects 15-17, wherein the indication of the modulation and coding scheme indicates a difference between the modulation and coding scheme for symbols associated with the amplitude-modulated PT-RSs and a modulation and coding scheme for symbols associated with other data of the uplink transmission or the downlink transmission.

Aspect 19: The method of any of Aspects 1-18, further comprising: decoding data that is multiplexed with a PT-RS sequence on resources associated with the amplitude-modulated PT-RSs based at least in part on: a configured modulation and coding scheme for amplitude-modulated PT-RSs of downlink transmissions; or a configured difference between a modulation and coding scheme for amplitude-modulated PT-RSs and a modulation and coding scheme for other data of downlink transmissions.

Aspect 20: The method of any of Aspects 1-19, wherein transmitting the indication of the capability of the UE comprises one or more of: transmitting the indication via one or more of radio resource control signaling, a medium access control control element, or a physical uplink control channel message, or transmitting a request, for an uplink transmission or a downlink transmission, for amplitude-modulated PT-RSs.

Aspect 21: The method of Aspect 20, further comprising: communicating the uplink transmission or the downlink transmission based at least in part on an assumption, based at least in part on transmitting the request, that the uplink transmission or the downlink transmission is to be transmitted with amplitude-modulated PT-RSs.

Aspect 22: The method of any of Aspects 1-21, further comprising: receiving configuration information that indicates that a base station is to provide an indication of whether amplitude-modulated PT-RSs are enabled.

Aspect 23: The method of any of Aspects 1-22, further comprising: receiving an indication to communicate based at least in part on amplitude-modulated PT-RSs.

Aspect 24: The method of Aspect 23, wherein receiving the indication comprises: receiving the indication via one or more of: a downlink control information message, a medium access control control element, or radio resource control signaling.

Aspect 25: The method of any of Aspects 1-24, further comprising: receiving the downlink transmission; determining, based at least in part on variations of amplitudes of resources associated with PT-RSs of the downlink transmission, that the downlink transmission has amplitude-modulated PT-RSs; estimating, based at least in part on the amplitude-modulated PT-RSs, a common phase error for the downlink transmission; and attempting to extract data from the amplitude-modulated PT-RSs.

Aspect 26: A method of wireless communication performed by a base station, comprising: receiving an indication of a capability of a user equipment (UE) to communicate one or more of uplink transmissions or downlink transmissions having amplitude-modulated phase tracking reference signals (PT-RSs) on at least a first layer of a multilayered communication link that includes the first layer and a second layer; and communicating an uplink transmission or a downlink transmission based at least in part on the indication.

Aspect 27: The method of Aspect 26, further comprising: determining whether to transmit the downlink transmission with amplitude-modulated PT-RSs, or to indicate to the UE to transmit an uplink transmission, based at least in part on one or more of: an amount of data buffered for the downlink transmission or the uplink transmission, a size of a resource grant associated with the downlink transmission or the uplink transmission, a reference signal received power associated with the UE, or movement of the UE.

Aspect 28: The method of any of Aspects 26-27, wherein the amplitude-modulated PT-RSs comprise: a PT-RS sequence indicated by phases of the amplitude-modulated PT-RSs, and data that is indicated by amplitudes of the amplitude-modulated PT-RSs.

Aspect 29: The method of any of Aspects 26-28, wherein communicating the uplink transmission or the downlink transmission comprises transmitting the downlink transmission or receiving the uplink transmission with amplitude-modulated PT-RSs on a set of resources on the first layer, and wherein transmitting the downlink transmission or receiving the uplink transmission comprises: transmitting the downlink transmission or receiving the uplink transmission with amplitude-modulated PT-RSs on the set of resources on the second layer, or transmitting the downlink transmission or receiving the uplink transmission with data on the set of resources on the second layer.

Aspect 30: The method of any of Aspects 26-29, wherein communicating the downlink transmission comprises receiving the uplink transmission, and wherein receiving the uplink transmission comprises: performing minimum mean square error equalization on the uplink transmission to produce a first stream associated with the first layer and a second stream associated with the second layer; aggregating, for symbols having at least one resource allocated for amplitude-modulated PT-RSs, signals received via resources allocated for amplitude-modulated PT-RSs; generating, based at least in part on aggregated signals received via the resources allocated for amplitude-modulated PT-RSs, complex coefficients for the respective symbols having at least one resource allocated for amplitude-modulated PT-RSs; and determining, based at least in part on the complex coefficients, common phase errors for the respective symbols having at least one resource allocated for amplitude-modulated PT-RSs.

Aspect 31: The method of Aspect 30, further comprising: determining, based at least in part on the common phase errors, common channel phase estimates for the first stream and the second stream.

Aspect 32: The method of any of Aspects 26-31, wherein communicating the uplink transmission or the downlink transmission comprises transmitting the downlink transmission, and wherein transmitting the downlink transmission comprises: applying an amplitude, based at least in part on data to be transmitted on a set of resources allocated for the amplitude-modulated PT-RSs, to a signal to be transmitted via the first layer; and applying a phase, based at least in part on a known PT-RS sequence to be transmitted on the set of resources allocated for the amplitude-modulated PT-RSs, to the signal to be transmitted via the first layer.

Aspect 33: The method of any of Aspects 26-32, wherein the first layer is associated with a first demodulation reference signal (DMRS) port that has a signal strength that is higher than a signal strength of a DMRS port that is associated with the second layer.

Aspect 34: The method of any of Aspects 26-33, wherein communicating the uplink transmission or the downlink transmission comprises: transmitting the downlink transmission or receiving the uplink transmission based at least in part on: a first codeword for data carried via a set of resources allocated for amplitude-modulated PT-RSs on the first layer, and a second codeword that is different from the first codeword, for data carried via the set of resources on the second layer.

Aspect 35: The method of Aspect 34, wherein the second codeword is a same codeword used for data carried via an additional set of resources allocated for data on the second layer.

Aspect 36: The method of any of Aspects 26-35, wherein data that is transmitted on resources associated with amplitude-modulated PT-RSs has a cyclical redundancy check (CRC) that is different from one or more CRCs associated with other data of the uplink transmission or the downlink transmission.

Aspect 37: The method of any of Aspects 26-36, wherein data transmitted on resources associated with the amplitude-modulated PT-RSs is associated with a dedicated acknowledgement/negative acknowledgment (ACK/NACK) bit that is different from one or more ACK/NACK bits that are associated with other data communicated via the uplink transmission or the downlink transmission.

Aspect 38: The method of Aspect 37, further comprising: receiving a NACK for the amplitude-modulated PT-RSs; and transmitting a repetition of the amplitude-modulated PT-RSs via a subsequent PT-RS resource.

Aspect 39: The method of any of Aspects 26-38, further comprising: receiving a request for a modulation and coding scheme for symbols associated with the amplitude-modulated PT-RSs.

Aspect 40: The method of Aspect 39, wherein receiving the request for the modulation and coding scheme comprises: receiving the request for the modulation and coding scheme with a request for amplitude-modulated PT-RSs.

Aspect 41: The method of any of Aspects 26-40, further comprising: transmitting an indication of a modulation and coding scheme for symbols associated with the amplitude-modulated PT-RSs.

Aspect 42: The method of Aspect 41, wherein the indication of the modulation and coding scheme is based at least in part on feedback signaling associated with a previous uplink transmission having amplitude-modulated PT-RSs.

Aspect 43: The method of any of Aspects 41-42, wherein transmitting the indication of the modulation and coding scheme comprises: transmitting the indication of the modulation and coding scheme via downlink control information, radio resource control signaling, or one or more medium access control control elements.

Aspect 44: The method of any of Aspects 41-43, wherein the indication of the modulation and coding scheme indicates a difference between the modulation and coding scheme for symbols associated with the amplitude-modulated PT-RSs and a modulation and coding scheme for symbols associated with other data of the uplink transmission or the downlink transmission.

Aspect 45: The method of any of Aspects 26-44, further comprising: decoding data that is multiplexed with a PT-RS sequence on resources associated with the amplitude-modulated PT-RSs based at least in part on: a configured modulation and coding scheme for amplitude-modulated PT-RSs of uplink transmissions; or a configured difference between a modulation and coding scheme for amplitude-modulated PT-RSs and a modulation and coding scheme for other data of uplink transmissions.

Aspect 46: The method of any of Aspects 26-45, wherein receiving the indication of the capability of the UE comprises one or more of: receiving the indication via one or more of radio resource control signaling, a medium access control control element, or a physical uplink control channel message, or receiving a request, for an uplink transmission or a downlink transmission, for amplitude-modulated PT-RSs.

Aspect 47: The method of Aspect 46, further comprising: communicating the uplink transmission or the downlink transmission based at least in part on an assumption, based at least in part on receiving the request, that the uplink transmission or the downlink transmission is to be transmitted with amplitude-modulated PT-RSs.

Aspect 48: The method of any of Aspects 26-47, further comprising: transmitting configuration information that indicates that the base station is to provide an indication of whether amplitude-modulated PT-RSs are enabled.

Aspect 49: The method of any of Aspects 26-48, further comprising: transmitting an indication to communicate based at least in part on amplitude-modulated PT-RSs.

Aspect 50: The method of Aspect 49, wherein transmitting the indication comprises: transmitting the indication via one or more of: a downlink control information message, a medium access control control element, or radio resource control signaling.

Aspect 51: The method of any of Aspects 26-50, further comprising: receiving the uplink transmission; determining, based at least in part on variations of amplitudes of resources associated with PT-RSs of the uplink transmission, that the uplink transmission has amplitude-modulated PT-RSs; estimating, based at least in part on the amplitude-modulated PT-RSs, a common phase error for the uplink transmission; and attempting to extract data from the amplitude-modulated PT-RSs.

Aspect 52: An apparatus for wireless communication at a device, comprising a processor; memory coupled with the processor; and instructions stored in the memory and executable by the processor to cause the apparatus to perform the method of one or more Aspects of Aspects 1-51.

Aspect 53: A device for wireless communication, comprising a memory and one or more processors coupled to the memory, the memory and the one or more processors configured to perform the method of one or more Aspects of Aspects 1-51.

Aspect 54: An apparatus for wireless communication, comprising at least one means for performing the method of one or more Aspects of Aspects 1-51.

Aspect 55: A non-transitory computer-readable medium storing code for wireless communication, the code comprising instructions executable by a processor to perform the method of one or more Aspects of Aspects 1-51.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 1-51.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit an indication of a capability of the UE to communicate amplitude-modulated phase tracking reference signals (PT-RSs) on at least a first layer of a multilayered communication link that includes the first layer and a second layer; and communicate an uplink transmission or a downlink transmission using the amplitude-modulated PT-RSs on at least the first layer of the multilayered communication link based at least in part on the indication, the amplitude-modulated PT-RSs comprising:
 a PT-RS sequence indicated by phases of the amplitude-modulated PT-RSs, and
 at least downlink shared channel data or uplink shared channel data that is indicated by amplitudes of the amplitude-modulated PT-RSs.

2. The UE of claim 1, wherein the one or more processors, to communicate the uplink transmission or the downlink transmission, are configured to receive the downlink transmission or transmit the uplink transmission with the amplitude-modulated PT-RSs on a set of resources on the first layer, and wherein the one or more processors, to receive the downlink transmission or transmit the uplink transmission, are configured to:
 receive the downlink transmission or transmit the uplink transmission with amplitude-modulated PT-RSs on the set of resources on the second layer, or
 receive the downlink transmission or transmit the uplink transmission with the at least the downlink shared channel data or uplink shared channel data on the set of resources on the second layer.

3. The UE of claim 1, wherein the one or more processors, to communicate the downlink transmission, are configured to receive the downlink transmission, and wherein the one or more processors, to receive the downlink transmission, are configured to:
 perform minimum mean square error equalization on the downlink transmission to produce a first stream associated with the first layer and a second stream associated with the second layer;
 aggregate, for symbols having at least one resource allocated for amplitude-modulated PT-RSs, signals received via resources allocated for amplitude-modulated PT-RSs;
 generate, based at least in part on aggregated signals received via the resources allocated for amplitude-modulated PT-RSs, complex coefficients for respective symbols having at least one resource allocated for amplitude-modulated PT-RSs; and
 determine, based at least in part on the complex coefficients, common phase errors for the respective symbols having at least one resource allocated for amplitude-modulated PT-RSs.

4. The UE of claim 3, wherein the one or more processors are further configured to:
 determine, based at least in part on the common phase errors, common channel phase correction coefficients for the first stream and the second stream.

5. The UE of claim 1, wherein the first layer is associated with a first demodulation reference signal (DMRS) port that has a signal strength that is higher than a signal strength of a DMRS port that is associated with the second layer.

6. The UE of claim 1, wherein the one or more processors, to communicate the uplink transmission or the downlink transmission, are configured to:
 transmit the uplink transmission or receive the downlink transmission based at least in part on:

a first codeword for data carried via a set of resources allocated for the amplitude-modulated PT-RSs on the first layer, and
a second codeword that is different from the first codeword, for data carried via the set of resources on the second layer.

7. The UE of claim 1, wherein data transmitted on resources associated with the amplitude-modulated PT-RSs is associated with a dedicated acknowledgement/negative acknowledgment (ACK/NACK) bit that is different from one or more ACK/NACK bits that are associated with other data communicated via the uplink transmission or the downlink transmission.

8. The UE of claim 1, wherein the one or more processors are further configured to:
 transmit a request for a modulation and coding scheme for symbols associated with the amplitude-modulated PT-RSs.

9. The UE of claim 1, wherein the one or more processors are further configured to:
 receive an indication of a modulation and coding scheme for symbols associated with the amplitude-modulated PT-RSs.

10. The UE of claim 1, wherein the one or more processors, to transmit the indication of the capability of the UE, are configured to:
 transmit the indication via one or more of radio resource control signaling, a medium access control element, or a physical uplink control channel message, or
 transmit a request, for an uplink transmission or a downlink transmission, for amplitude-modulated PT-RSs.

11. The UE of claim 1, wherein the one or more processors are further configured to:
 receive configuration information that indicates that a base station is to provide an indication of whether amplitude-modulated PT-RSs are enabled.

12. The UE of claim 1, wherein the one or more processors are further configured to:
 receive an indication to communicate based at least in part on amplitude-modulated PT-RSs via one or more of:
 a downlink control information message,
 a medium access control control element, or
 radio resource control signaling.

13. A method of wireless communication performed by a user equipment (UE), comprising:
 transmitting an indication of a capability of the UE to communicate amplitude-modulated phase tracking reference signals (PT-RSs) on at least a first layer of a multilayered communication link that includes the first layer and a second layer; and
 communicating an uplink transmission or a downlink transmission using the amplitude-modulated PT-RSs on at least the first layer of the multilayered communication link based at least in part on the indication, the amplitude-modulated PT-RSs comprising:
 a PT-RS sequence indicated by phases of the amplitude-modulated PT-RSs, and
 at least downlink shared channel data or uplink shared channel data that is indicated by amplitudes of the amplitude-modulated PT-RSs.

14. The method of claim 13, wherein communicating the uplink transmission or the downlink transmission comprises receiving the downlink transmission or transmitting the uplink transmission with the amplitude-modulated PT-RSs on a set of resources on the first layer, and wherein receiving the downlink transmission or transmitting the uplink transmission comprises:

receiving the downlink transmission or transmitting the uplink transmission with amplitude-modulated PT-RSs on the set of resources on the second layer, or receiving the downlink transmission or transmitting the uplink transmission with the at least the downlink shared channel data or uplink shared channel data on the set of resources on the second layer.

15. The method of claim 13, wherein communicating the downlink transmission comprises receiving the downlink transmission, and wherein receiving the downlink transmission comprises:
performing minimum mean square error equalization on the downlink transmission to produce a first stream associated with the first layer and a second stream associated with the second layer;
aggregating, for symbols having at least one resource allocated for amplitude-modulated PT-RSs, signals received via resources allocated for amplitude-modulated PT-RSs;
generating, based at least in part on aggregated signals received via the resources allocated for amplitude-modulated PT-RSs, complex coefficients for respective symbols having at least one resource allocated for amplitude-modulated PT-RSs; and
determining, based at least in part on the complex coefficients, common phase errors for the respective symbols having at least one resource allocated for amplitude-modulated PT-RSs.

16. The method of claim 15, further comprising:
determining, based at least in part on the common phase errors, common channel phase correction coefficients for the first stream and the second stream.

17. The method of claim 13, wherein the first layer is associated with a first demodulation reference signal (DMRS) port that has a signal strength that is higher than a signal strength of a DMRS port that is associated with the second layer.

18. The method of claim 13, wherein communicating the uplink transmission or the downlink transmission comprises:
transmitting the uplink transmission or receiving the downlink transmission based at least in part on:
a first codeword for data carried via a set of resources allocated for amplitude-modulated PT-RSs on the first layer, and
a second codeword that is different from the first codeword, for data carried via the set of resources on the second layer.

19. The method of claim 13, wherein data transmitted on resources associated with the amplitude-modulated PT-RSs is associated with a dedicated acknowledgement/negative acknowledgment (ACK/NACK) bit that is different from one or more ACK/NACK bits that are associated with other data communicated via the uplink transmission or the downlink transmission.

20. The method of claim 13, further comprising:
transmitting a request for a modulation and coding scheme for symbols associated with the amplitude-modulated PT-RSs.

21. The method of claim 13, further comprising:
receiving an indication of a modulation and coding scheme for symbols associated with the amplitude-modulated PT-RSs.

22. The method of claim 13, wherein transmitting the indication of the capability of the UE comprises one or more of:

transmitting the indication via one or more of radio resource control signaling, a medium access control control element, or a physical uplink control channel message, or transmitting a request, for an uplink transmission or a downlink transmission, for amplitude-modulated PT-RSs.

23. The method of claim 13, further comprising:
receiving configuration information that indicates that a base station is to provide an indication of whether amplitude-modulated PT-RSs are enabled.

24. The method of claim 13, further comprising:
receiving an indication to communicate based at least in part on amplitude-modulated PT-RSs via one or more of:
a downlink control information message,
a medium access control control element, or
radio resource control signaling.

25. A non-transitory computer-readable medium storing a set of instructions for wireless communication, the set of instructions comprising:
one or more instructions that, when executed by one or more processors of a user equipment (UE), cause the UE to:
transmit an indication of a capability of the UE to communicate amplitude-modulated phase tracking reference signals (PT-RSs) on at least a first layer of a multilayered communication link that includes the first layer and a second layer; and
communicate an uplink transmission or a downlink transmission using the amplitude-modulated PT-RSs on at least the first layer of the multilayered communication link based at least in part on the indication, the amplitude-modulated PT-RSs comprising:
a PT-RS sequence indicated by phases of the amplitude-modulated PT-RSs, and
at least downlink shared channel data or uplink shared channel data that is indicated by amplitudes of the amplitude-modulated PT-RSs.

26. An apparatus for wireless communication, comprising:
means for transmitting an indication of a capability of a user equipment (UE) to communicate amplitude-modulated phase tracking reference signals (PT-RSs) on at least a first layer of a multilayered communication link that includes the first layer and a second layer; and
means for communicating an uplink transmission or a downlink transmission using the amplitude-modulated PT-RSs on at least the first layer of the multilayered communication link based at least in part on the indication, the amplitude-modulated PT-RSs comprising:
a PT-RS sequence indicated by phases of the amplitude-modulated PT-RSs, and
at least downlink shared channel data or uplink shared channel data that is indicated by amplitudes of the amplitude-modulated PT-RSs.

27. The non-transitory computer-readable medium of claim 25, wherein, to communicate the uplink transmission or the downlink transmission, the one or more instructions, when executed by the one or more processors, cause the UE to receive the downlink transmission or transmit the uplink transmission with the amplitude-modulated PT-RSs on a set of resources on the first layer, and wherein, to receive the downlink transmission or transmit the uplink transmission, the one or more instructions, when executed by the one or more processors, cause the UE to:

receive the downlink transmission or transmit the uplink transmission with amplitude-modulated PT-RSs on the set of resources on the second layer, or receive the downlink transmission or transmit the uplink transmission with the at least the downlink shared channel data or uplink shared channel data on the set of resources on the second layer.

28. The non-transitory computer-readable medium of claim 25, wherein, to receive the downlink transmission, the one or more instructions, when executed by the one or more processors, cause the UE to:

perform minimum mean square error equalization on the downlink transmission to produce a first stream associated with the first layer and a second stream associated with the second layer;

aggregate, for symbols having at least one resource allocated for amplitude-modulated PT-RSs, signals received via resources allocated for amplitude-modulated PT-RSs;

generate, based at least in part on aggregated signals received via the resources allocated for amplitude-modulated PT-RSs, complex coefficients for respective symbols having at least one resource allocated for amplitude-modulated PT-RSs; and determine, based at least in part on the complex coefficients, common phase errors for the respective symbols having at least one resource allocated for amplitude-modulated PT-RSs.

29. The apparatus of claim 26, wherein, to communicate the uplink transmission or the downlink transmission, the apparatus comprises means for receiving the downlink transmission or transmitting the uplink transmission with the amplitude-modulated PT-RSs on a set of resources on the first layer, and wherein, to receive the downlink transmission or transmit the uplink transmission, the apparatus comprises:

means for receiving the downlink transmission or transmitting the uplink transmission with amplitude-modulated PT-RSs on the set of resources on the second layer, or means for receiving the downlink transmission or transmitting the uplink transmission with the at least the downlink shared channel data or uplink shared channel data on the set of resources on the second layer.

30. The apparatus of claim 26, wherein, to receive the downlink transmission, the apparatus comprises:

means for performing minimum mean square error equalization on the downlink transmission to produce a first stream associated with the first layer and a second stream associated with the second layer;

means for aggregating, for symbols having at least one resource allocated for amplitude-modulated PT-RSs, signals received via resources allocated for amplitude-modulated PT-RSs;

means for generating, based at least in part on aggregated signals received via the resources allocated for amplitude-modulated PT-RSs, complex coefficients for respective symbols having at least one resource allocated for amplitude-modulated PT-RSs; and means for determining, based at least in part on the complex coefficients, common phase errors for the respective symbols having at least one resource allocated for amplitude-modulated PT-RSs.

\* \* \* \* \*